(12) United States Patent
Ngoi et al.

(10) Patent No.: US 6,271,924 B1
(45) Date of Patent: Aug. 7, 2001

(54) NONCONTACT ACOUSTIC OPTIC SCANNING LASER VIBROMETER FOR DETERMINING THE DIFFERENCE BETWEEN AN OBJECT AND A REFERENCE SURFACE

(76) Inventors: Bryan Kok Ann Ngoi, Nanyang Technological University, School of Mechanical and Production Engineering, Nanyang Avenue, Singapore 639798; Krishnan Venkatakrishnan, Blk 101, #05-170, Jurong East St-13, Singapore 600101, both of (SG)

( * ) Notice: Subject to any disclaimer, the term of this patent is extended or adjusted under 35 U.S.C. 154(b) by 0 days.

(21) Appl. No.: 09/222,731
(22) Filed: Dec. 29, 1998
(51) Int. Cl.$^7$ ..................... G01B 9/02
(52) U.S. Cl. .................. 356/489; 356/495
(58) Field of Search .................. 356/349, 351, 356/357, 359, 360, 484, 485, 489, 495, 511, 591

(56) References Cited

U.S. PATENT DOCUMENTS

| | | | |
|---|---|---|---|
| 4,606,638 | 8/1986 | Sommargren | 356/351 |
| 5,218,424 | 6/1993 | Sommargren | 356/358 |
| 5,280,340 | 1/1994 | Lacey | 356/357 |
| 5,377,006 | * 12/1994 | Nakata | 356/349 |
| 5,694,216 | * 12/1997 | Riza | 356/349 |

OTHER PUBLICATIONS

"Laser Vibrometry: Pseudo–Vibrations," S.J. Rothberg et al., *Journal of Sound and Vibration* (1989) 135(3), pp. 516–522.

"Accurate Measurement of Gas–Lubricated Slider Bearing Separation Using Visible Laser Interferometry," T. Ohkubo et al., *Journal of Tribology*, Jan. 1988, vol. 110, pp. 148–155.

"The Laser Vibrometer: A Portable Instrument," C.J.D. Pickering et al., *Journal of Sound and Vibration*, 1980, pp. 471–485.

* cited by examiner

*Primary Examiner*—Samuel A. Turner
(74) *Attorney, Agent, or Firm*—Burns, Doane, Swecker & Mathis, LLP

(57) ABSTRACT

A technique and apparatus for non-contact scanning measuring of the dynamic parameters of micro and macro devices using an acousto optic scanning laser vibrometer are disclosed. The system includes an acousto optic deflector to induce scanning in the laser beam. The apparatus also includes either a heterodyne or homodyne system for laser scanning. The heterodyne detection technique involves two acousto optic deflectors driven by a common signal generator. The invention may include an interference technique in which the measuring scanning beam emitted by the acousto optic deflector interferes with the reference-scanning beam. For some applications, this acts as a second measuring beam. With this technique, the frequency shift induced in the laser beam on scanning with the acousto optic deflector is canceled due to fact that the two acousto optic deflector are of same specification and driven by a common driver. The invention may also include an apparatus and technique for homodyne detection. A method adopting single and double acousto optic deflectors in the optical layout is also disclosed for homodyne detection system. The technique also incorporates two axes scanning. The invention may include a computer controller to control the scanning parameters and the data capturing parameters simultaneously. This technique incorporates a parallel scanning beam of small spot size for the purpose of micro device inspection in optical head, hard disk, micro components, etc. The use of the invention for measurement of least fly-height information in hard disk by double axis scanning is also disclosed. The method and apparatus for applying the invention to measuring the dynamic parameters of rotating targets and eliminating the error induced due to pseudo vibration noise is also disclosed.

60 Claims, 25 Drawing Sheets

X- Axis Scanning

NONCONTACT ACOUSTIC OPTIC SCANNING LASER VIBROMETER FOR DETERMINING THE DIFFERENCE BETWEEN AN OBJECT AND A REFERENCE SURFACE

FIELD OF THE INVENTION

The present invention relates to the apparatus and technique for high precision measurement of dynamic parameters of micro and macro components applying homodyne and heterodyne detection methods. The present invention is also suitable for measurement of least fly-height information in a hard disk and precise measurement of dynamic parameters of rotating target, optical head and micro devices.

BACKGROUND AND PRIOR ART

A laser vibration-measuring system has the advantage of being non-contact in measurement of vibration. Some applications require not only point vibration measurement but also surface vibration at several critical points by deflecting the beam at different angles by what is called the scanning technique. The scanning vibration measurement is highly essential for accurately measuring the dynamic parameters of micro devices, disc surface, etc. Since conventional mechanical movement of the object under investigation from one point to the next will not eventually result in precise measurement, which is not practicable for most applications. Present techniques of scanning in laser vibrometers apply a rotating polygonal mirror or a deflecting mirror for scanning purposes. Since the mirror is driven mechanically, the system is subjected to inaccuracy. Moreover, the scanning mirror is subjected to vibration which degrades the accuracy of vibration measurement to a considerable extent. This vibration effect is more predominant when the scanning rate is high (sweep time of scanning is less). This vibration will also result in reduction of the resolution of scanning, i.e., number of resolvable spots. Moreover, the laser beam spot size needs to be considerably reduced for microstructure inspection.

For micro devices such as components in an optical head, hard disk drive (run out, acceleration, head gimbel resonance, dynamic response of slider bearing, etc.), dynamic characteristics are important to be measured and analyzed. Point vibration measurement does not reveal complete and accurate dynamic information along the surface. So these miniaturized devices need to be moved by conventional means from point to point to investigate the device at several points, which leads to inaccuracy. Moreover, this is not possible for most of the micro devices, which require in process investigation.

Any point on the surface of a rotating target is composed of both tilt and in-plane motion and hence the resultant speckle velocity has a component of each motion type. So using a laser scanning vibrometer on rotating a target is more complicated, since the speckle pattern sampled by the detector will change spatially. This effect will produce a phase modulation of the detector output and is indistinguishable from the Doppler frequency shift associated with surface movement (dynamic characteristics) to be measured. Since the noise is linked to the vibrating frequency of interest, uncertainty is induced in the measurement, which necessitates the use of engineering judgement in the interpretation of the result. Moreover, when this speckle noise due to periodic target motion has a fundamental frequency as the vibration to be measured, then it is difficult to distinguish the noise. One method of eliminating the effect of this noise is disclosed by Pickering et al. in the paper entitled "The Laser Vibrometer: A Portable Instrument," *Journal of Sound and Vibration,* utilizes a rotating scattered disk as frequency shifting device, thereby the noise spectrum of the device will be comparable with the noise spectrum produced by the rotating target, and it can be canceled. Adopting the above technique will not eventually eliminate the noise effect since the rotating scattered disk does not rotate at exactly the same speed as the rotating target. Moreover, the surface of the rotating target and the rotating scatted disk may not be the same. This process will not provide an accurate remedy to the problem. Rothberg et al. in the paper entitled "Laser Vibrometry: Pseudo Vibration," *Journal of Sound and Vibration,* 1990, describes an engineering judgement technique to eliminate the pseudo-vibration of the speckle noise. A value above a prescribed height of the speckle noise peak, obtained by experiments is accepted as valid vibration data. This method is based on an assumption and can lead to uncertainty.

With the increase in the data storage capacity in a small area, the track density becomes higher and the distance of slider head from the disk surface becomes lower. So the measurement of fly-height in the range of nanometers is highly essential. Although there are several fly-height testers applying a white light interferometer fly-height tester, multiple wavelength fly-height tester described by C. Lacey in U.S. Pat. No. 5,280,340, monochromatic fly-height tester described in the article "Accurate Measurement of Gas-Lubricated Slider Bearing Separation using Interferometer" by T. Ohkubo and J. Kishegami, polarization phase modulated interferometric fly-height tester described by G. Sommargren in U.S. Pat. Nos. 4,606,638 and 5,218,424, phase shifting interferometric fly-height tester, etc., they are subjected to limitations. Since glass plate, which replaces the actual disk, rotating at high speed is subjected to internal stresses and hence the index of refraction varies throughout the material. This will result in the reduction in the accuracy of the system due to the change in the wavelength of the laser beam applied for measurement. Since the slider is flying obliquely, fly-height at a point will not reveal the least fly-height in the system but the fly-height at the point. So it is necessary to obtain the fly-height information at various points by scanning the beam accurately rather than using mechanical movement of the disk assembly, which is not possible using the current available systems. Also, the present systems are limited by the problem of misalignment of the measuring beam since the beam is incident at an angle rather than perpendicular to the disk surface and the slider head surface. The fly-height thus measured will be influenced by the error due to misalignment.

SUMMARY OF THE INVENTION

The present invention includes a method of measuring the dynamic parameters of an object by applying a scanning laser beam system, employing acousto optic deflectors for scanning. The first preferred embodiment of the present invention is a heterodyne laser scanning system, which includes an acousto optic modulator for frequency shifting of the laser beam. Moreover, two acousto optic deflectors driven by a common signal generator or driver are employed one each in the reference and measuring paths. The measuring scanning beam strikes the target of measurement as a series of parallel beams and the reflected beam thus carries information on the dynamic parameters of the target. The measuring and reference beam is made to interfere in accordance with the novel features of the present invention such that the measuring and reference scanning beams interfere, resulting in an interference beam in which the frequency shift induced due to the acousto optic deflector is canceled. The measuring interfered scanned beam thus obtained is focused on to the measuring photo detector. Similarly, the reference interfering beam due to interference of the zero order beams emitted from both the acousto optic deflectors is focused on to reference photo detector.

The preferred embodiment of the present invention employs a computer control system to control the parameters of scanning and an overall control system which controls the scanning parameters and the data capturing system to capture data corresponding to each of the scanning points. The system can be modified to two axis scanning by employing two acousto optic deflectors such that the acoustic wave in the X-axis acousto optic deflector is perpendicular to the acoustic wave in the Y-axis acousto optic deflector. Moreover, the alignment is such that the scanning beam from the preceding acousto optic deflector strikes the acousto optic wave in the succeeding acousto optic deflector at a Bragg angle. The heterodyne system adopts methods of measuring the phase shift or the frequency shift between the measuring and reference interference signal from the measuring and reference photo-detector.

The first embodiment can be altered to improve the accuracy of the system by eliminating some of the optical components and hence employing common optical components so as to minimize the error induced due to external environment. This will eventually simplify the system.

The second embodiment of the present invention includes the homodyne laser scanning vibrometry system which applies the same optical layout and technique as in the heterodyne system but the need for frequency shifting by utilizing an acousto optic modulator is eliminated. Further, the necessity of interfering the zero order beams from the acousto optic deflector is also eliminated.

Further, the third preferred embodiment of the present invention is the homodyne laser scanning vibrometry system employing a single acousto optic deflector for single axis scanning rather than two acousto optic deflectors in the measuring and reference path due to the novel optical design. Similarly, it makes use of two acousto optic deflectors for two axis scanning rather than four acousto optic deflectors, two in each of the measuring and reference path. By this technique the system is simplified and also the cost of the system is reduced. This homodyne system adapts quaderature signal processing technique or other homodyne signal processing techniques.

The fourth preferred embodiment of the present invention is the application of the heterodyne and homodyne system in the previous embodiments for fly-height measurement. In this embodiment the measuring scanning beam strikes the disk surface and the reference scanning beam strikes the target object in the slider and also vice versa. With this embodiment of the present invention, the least fly-height between the disk surface and the target surface in the slider can be measured by adopting a two axis scanning system as described in the previous embodiments.

The fifth preferred embodiment of the present invention is the application of the heterodyne and homodyne system in the previous embodiments for measuring the dynamic parameters of a rotating target surface. In this embodiment, the measuring scanning parallel beam strikes the surface of the rotating target and the reference scanning parallel beam strikes the other surface of the rotating target. One important aspect of this novel technique is that the optical axis of the measuring scanning parallel beam is aligned to the optical axis of the reference scanning parallel beam so that both the beams strikes the rotating target surface on either side of the same point. Another important aspect of this embodiment is that the effect of error induced due to pseudo vibration is nearly eliminated by canceling the pseudo vibration induced in the measuring and reference beam.

The sixth embodiment of the present invention is the application of a single acousto optic deflector for each of the scanning direction rather than two acousto optic deflectors as in previous embodiments. The system is applicable to fly-height measurement, dynamic parameter measurement of micro and macro features and also for rotating targets. The system employs a scanning lens such as f-Theta lens for reducing the beam size and focusing the beam on to the target.

DESCRIPTION OF THE DRAWINGS

FIG. 15b is a drawing showing the side view of the FIG. 15a;

FIG. 15c is a drawing showing the top view of FIG. 15a;

DETAILED DESCRIPTION OF THE INVENTION

First Embodiment of the Present Invention

Figure 1:
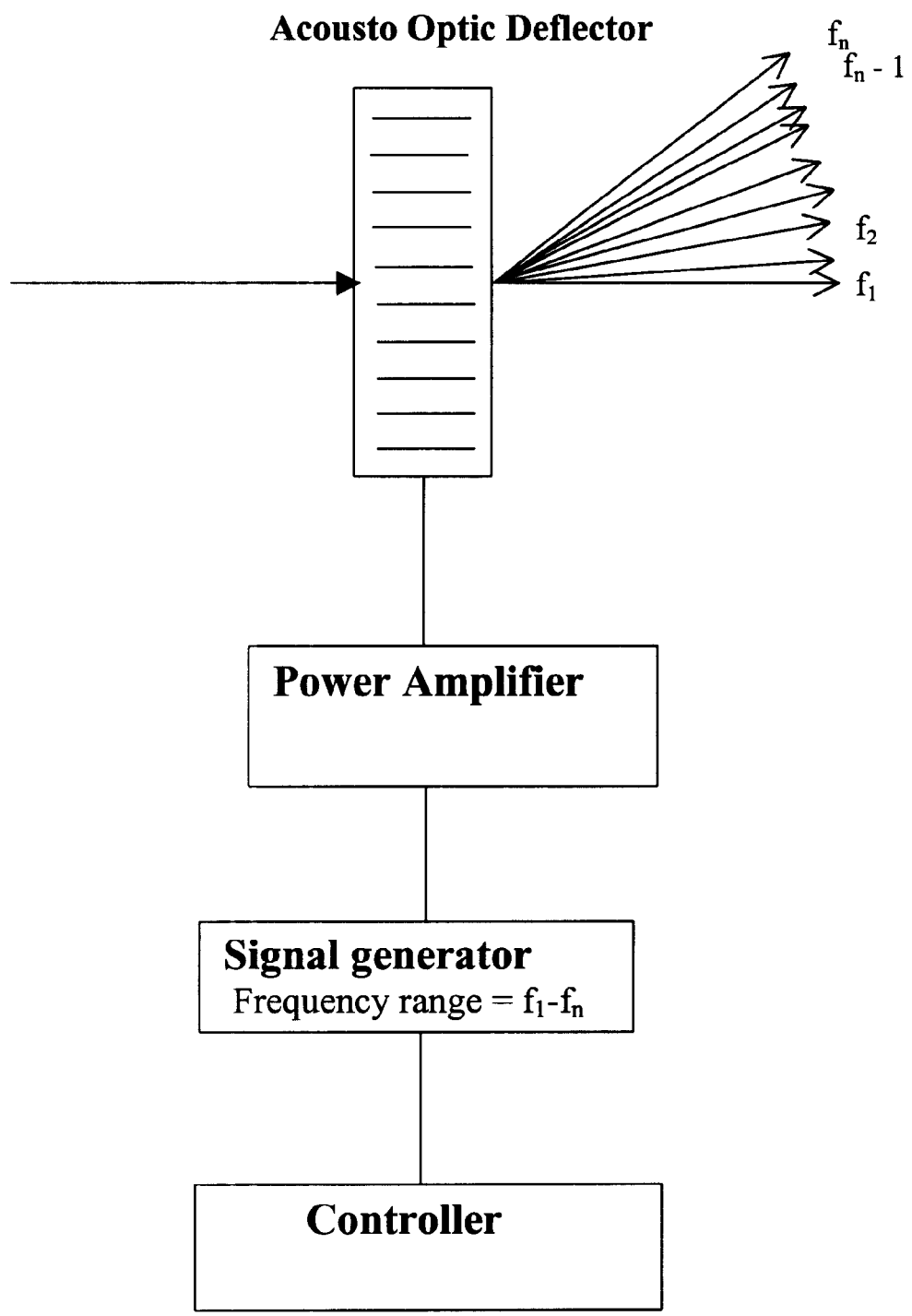
FIG. 1 is a drawing showing the scanning of a laser beam by using an acousto optic deflector.

The preferred embodiment of the invention employs an interferometric set up for preferably measuring the dynamic information of the object under investigation. FIG. 1 shows the basic design of the acousto optic scanning technique applied in the present invention, where we obtain beam at different angle depending on the frequency input ($f_1-f_n$) to the acousto optic deflector by the signal generator.

Figure 2:
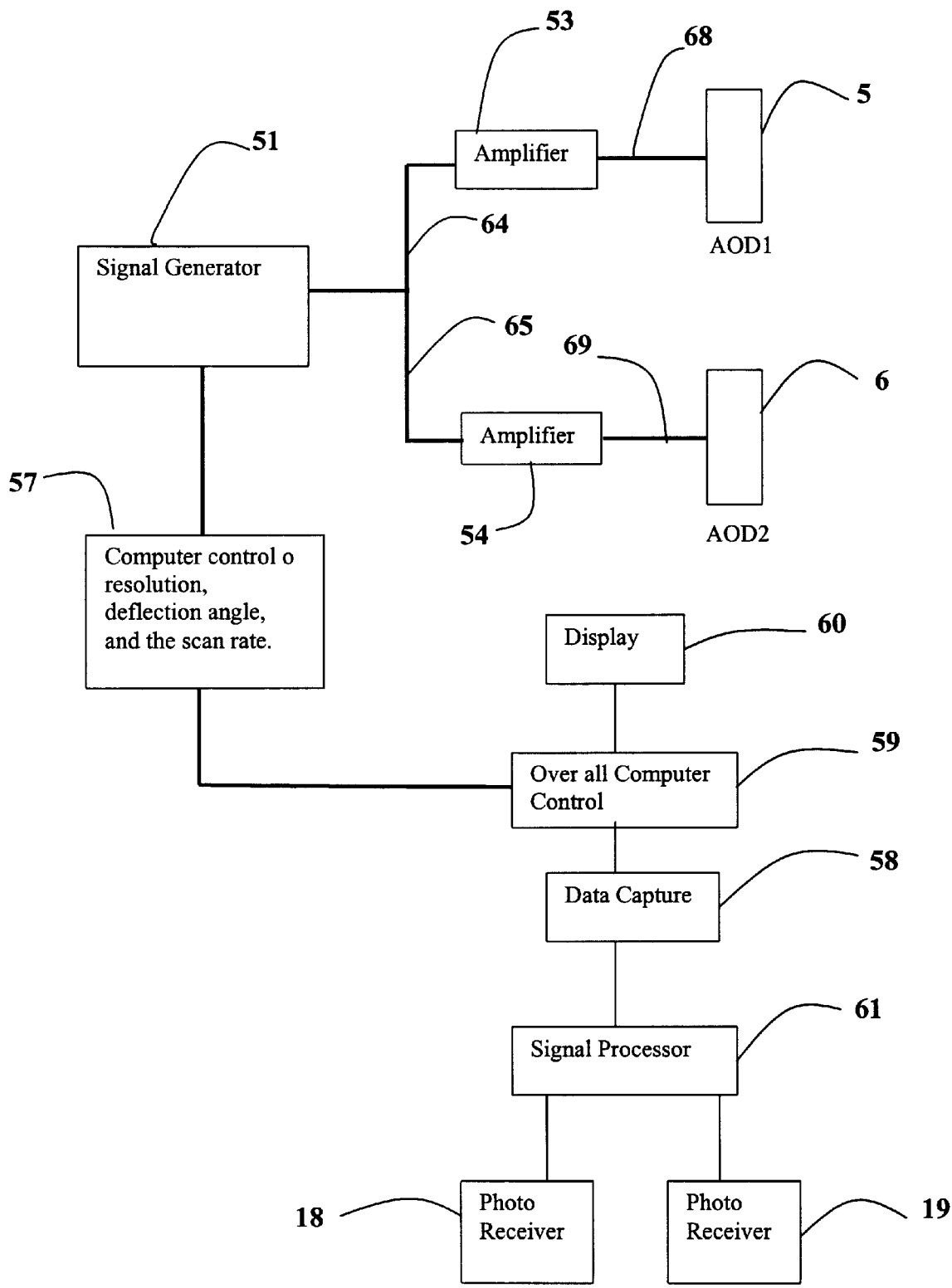
FIG. 2 is a drawing showing the layout of the scanning system, signal processing system and the control system for scanning and data capturing for single axis scanning using two acousto optic deflector for heterodyne and homodyne system.

FIG. 2 discloses the control and signal processing system employed in the first preferred embodiment of this invention. The highly stable sinusoidal frequency signal preferably from the signal generator 51 is split into two preferably equal highly stable frequency sinusoidal signals 64 and 65 to preferably two power amplifiers 53 and 54 to amplify the power of the stable sinusoidal frequency signal from the signal generator. The signal is power amplified, depending on the requirement of the transducer driving power in the acoustic crystal. The amplified signals 68 and 69 from the power amplifiers 53 and 54 are applied to the acousto optic crystal 5 and 6. The acousto optic crystal 5 and 6 have preferably a wide band with depending on the scanning angle required for the application. The two acousto optic crystal 5 and 6 are preferably made of the same specifications for bandwidth, acoustic crystal material, acoustic wavelength, acoustic velocity, transducer dimension, crystal dimension. The acousto optic crystal acts as a scanner/deflector by varying the signal input preferably from the signal generator. Since the two acousto optic crystals are driven by the same signal generator, the frequency shift and hence the deflection angle of the output preferably the first order beams 26 and 30 from the acousto optic crystals are the same.

A computer controller 57 controls the signal generator or the driver 51. The computer controller 57 controls the scanning angle, preferably by controlling the maximum and minimum sinusoidal frequency signal from the signal generator 51. The scanning rate or sweep time of scanning is varied by preferably varying the rate of change in the frequency signal with respect to time from the signal generator 51. The resolution of scanning, i.e., the number of distinguishable spots for a given angle is preferably controlled by the computer controller 57 by generating the corresponding number of distinguishable frequency outputs from the signal generator 51. The overall computer controller 59 registers or records preferably the dynamic data captured by the data acquisition system 58 of the specimen at the corresponding points of the scanning beam at the corresponding time depending on the scanning control on the signal generator 51. The captured dynamic data is displayed in the computer display 60. The system is capable of performing scanning/deflecting beam operation in two modes, namely, continuous sweeping and manual scanning. Continuous sweeping control can perform scanning of the beam continuously at required resolution, scan angle or length and sweeping rate. Moreover, manual scanning permits deflecting the beam to a prescribed location. The overall computer controller 59 can eliminate the need for controller for scanning 57 by also performing its operation.

Figure 3:
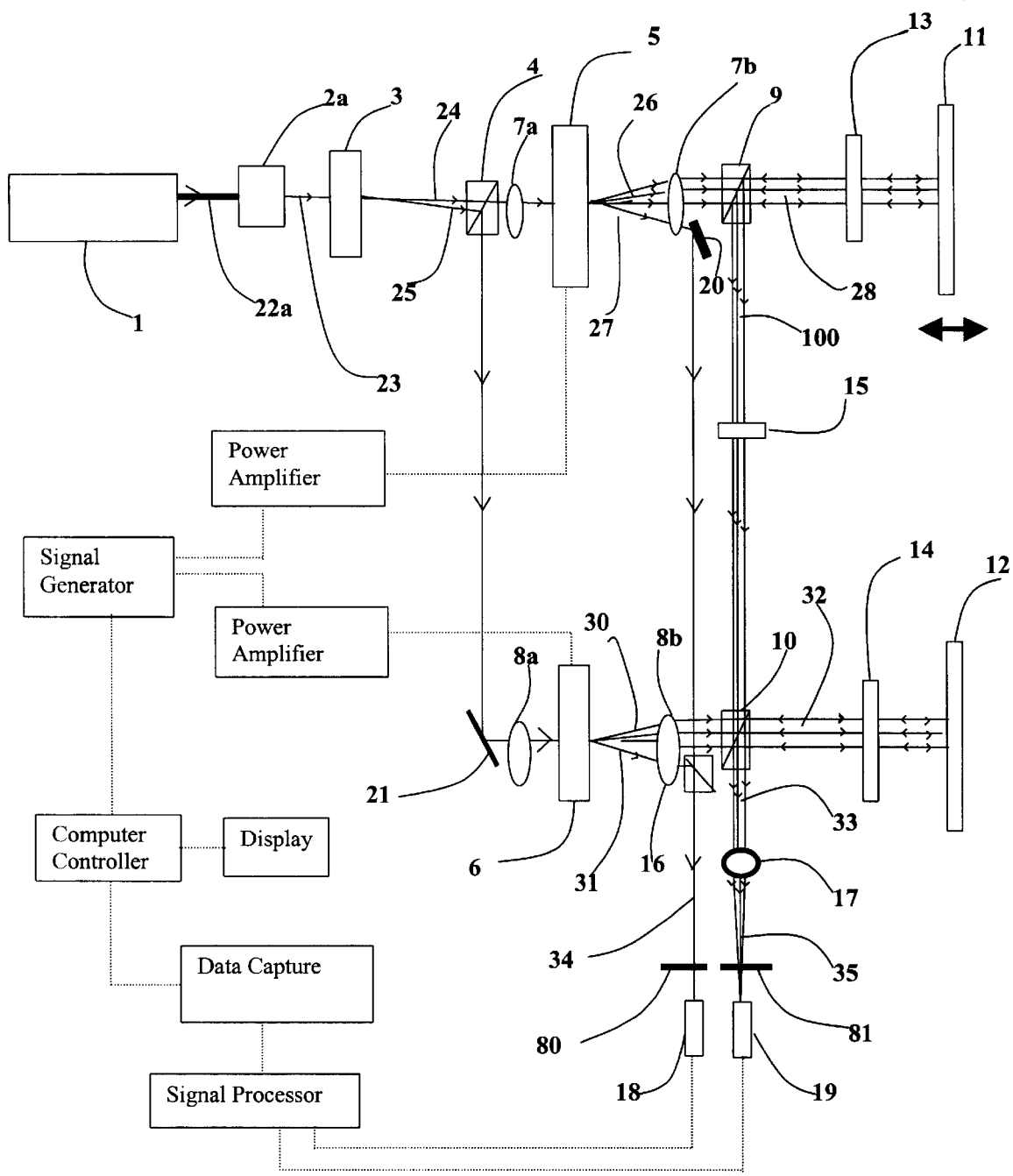
FIG. 3 is a drawing showing the heterodyne acousto optic scanning vibrometry set up for the preferred embodiment one of the invention.

As disclosed from FIG. 3 the laser beam 22a from the laser source 1, which is frequency stabilized of preferably 638.2 nm wavelength. The preferably linearly polarized laser beam passes though a beam reducer 2a, which preferably performs the operation of the beam expander in the reverse manner. The beam reducer comprises a combination of optical components, preferably of a collimating type, which may be of different reducing power depending on the precision of measurement, size of the structure and the complexity of the structure under investigation. The beam reducer preferably has a large focal length and has minimum divergence of the beam so as to maintain constant size of the beam over the entire optical path. The reduced beam 23 incident at the acousto optic modulator 3, preferably at Bragg's angle. A signal generator 101 drives the modulator 3 at the preferred stable frequency. The beam 23 preferably undergoes an-isotropic interaction in the acoustic crystal producing two orthogonally polarized beam 24 and 25 with respect to each other of a frequency difference equal to the center frequency of the acoustic wave in the acousto optic modulator 3. The first order beam 24 and the zero order beam 25 passes through preferably a polarizing beam splitter and are split in a perpendicular direction. The first order frequency modulator beam 24 is made to pass through a focusing lens 7a and incident on the moving acoustic wave in the acousto optic deflector 5 at preferably Bragg's angle.

Figure 4:
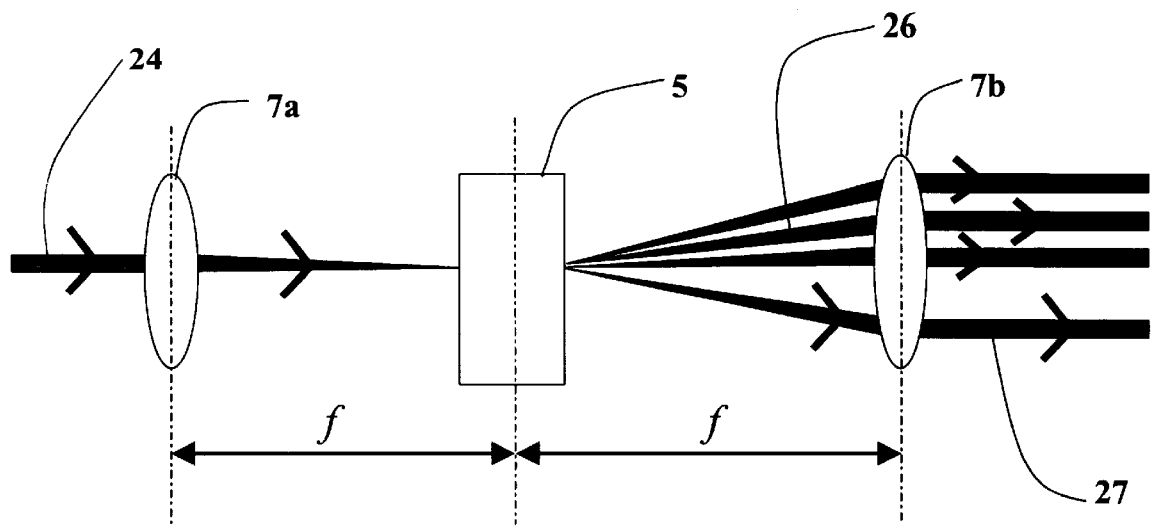
FIG. 4 is a drawing showing the collimating technique applied in the optical layout for the preferred embodiments of the invention.

Referring to FIG. 4 the acousto optic deflector 5 is placed such that the axis of the acoustic crystal 5 is preferably at the focal point of the focusing lens 7a. The preferably first order beam 26 is deflected by an angle depending on the frequency signal input to the acousto optic deflector from the signal generator. By varying the frequency signal input scanning, laser beam 26 is obtained. At all times, a single scanning laser beam is obtained from a deflector, which is shown in all of the disclosed figures as a series of beams or multiple beams for better understanding. The scanning laser beam 26 and the zero order beam 27 preferably pass through a focusing lens 7b, which preferably collimates the laser beam. The focusing lens 7b is preferably of the same specification as the focusing lens 7a. In addition, the focusing lens is preferably placed at the focal length of the lens from the axis of the acoustic crystal. This process leads to collimation of the beam with no or minor divergence. Also, the acousto optic deflector 5 can be placed in any position between the two collimating lenses 7a and 7b. The closer the acousto optic deflector 5 is to the lens 7a, the larger will be the scan length. Also the larger the focal length of the collimating lenses, larger will be the scan length. The scan length can be varied, by changing the position of the acousto optic deflector between the two lenses 7a and 7b and by using different focal length collimating optics 7a and 7b. Moreover, the two lenses can also be of different specifications in which case the diameter of the scanning beam is increased or decreased. The collimated laser beam 28 preferably passes through a polarizing beam splitter 9 without deflection. The beam 28 passes through preferably a wave plate 13, which may, for example, be a quarter wave plate. The effect of the wave plate 13 is to preferably shift the relevant phase of the laser beam. The beam after passing through wave plate 13 scans the target under investigation 11 over a distance depending on the control in frequency signal induced in the acousto optic deflector 5 by the computer controller 57. The beam 28 is then deflected from the object under investigation 11 and preferably passes through the same wave plate 13, thereby preferably reversing the polarization of the laser beam. The reflected beam then preferably passes through the beam splitter 9 and may be deflected by 90 degrees due to the change in the polarization angle of the reflected laser beam with respect to the incident beam. The deflected beam 100 may preferably pass through a wave plate 15, which may for example be a half wave plate and alter the polarization state of the laser beam. The beam then preferably passes through a polarizing beam splitter 9 where it interferes with the reference laser beam reflected from the reference surface preferably a mirror.

Figure 5A:
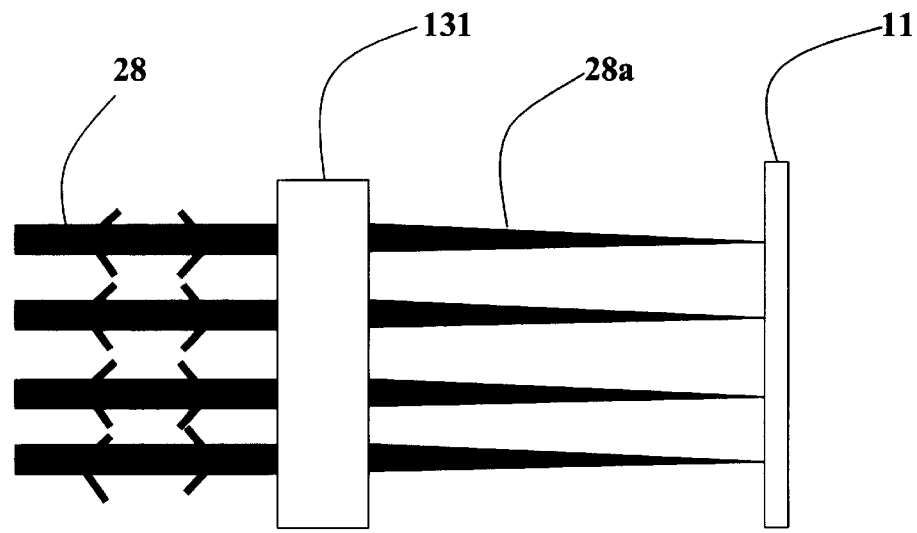
FIG. 5a is a drawing showing the application of scanning lens to focus the beam onto the target object for the purpose of reducing the spot size of the laser beam.

Referring to FIG. 5a a scanning lens 131 or other lens combination which focus the parallel scanning beam on a single plane, can eliminate the beam reducer 2a in the optical layout. The scan lens 131 focuses the beam 28 on to the target 11 and focusing beam 28a hits the target at nearly the focal point to have minimum beam size and hence maximum resolution. The scan lens 131 is preferably of a long focal length depending on the object location with reference to the equipment. In the current system employing the scanning lens or other similar lenses the beam reducer 2a is replaced by beam expander 2b, which is preferably of a variable beam expansion type.

Figure 5B:
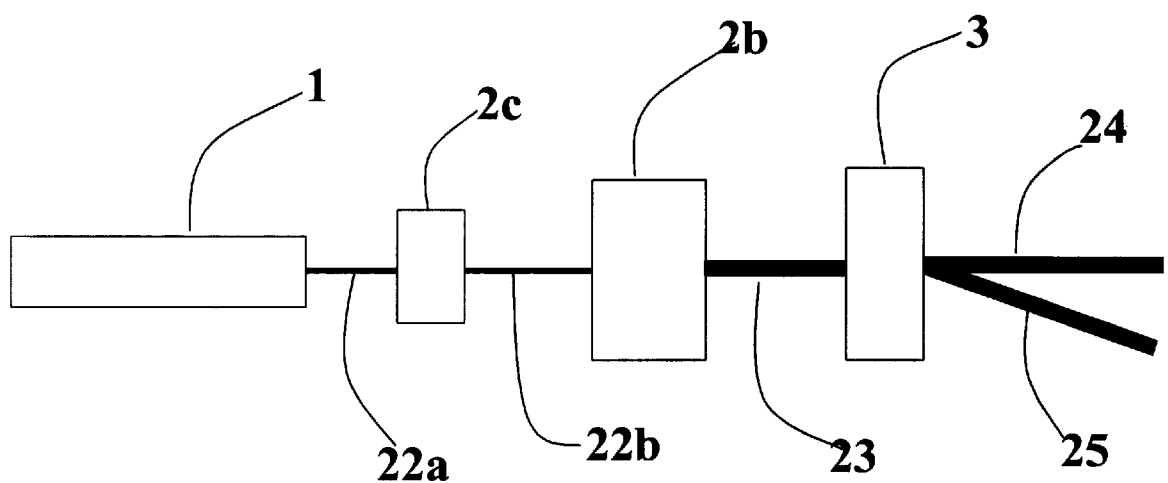
FIG. 5b is a drawing showing the application of beam expander to expand the beam size to the required size so as to reduce the spot size from the scanning beam.

As shown in FIG. 5b the beam 22a from the source 1 preferably passes through a spatial filter 2c, which filters the beam. The filtered beam 22b from the spatial filter 2c preferably pass through a beam expander 2b of variable or fixed beam expansion capability. The output beam 23 from the beam expander 2b is expanded depending on the beam expansion ratio set in the beam expander 2b. This process of beam expansion will eventually control the spot size of the focused beam from the scanning lens 131. The larger the diameter of the input beam to the scanning lenses 131 the smaller will be the focused beam spot size from the scanning lens 131. So by varying the beam expansion ratio variable spot size can be achieved to suit the requirement. Also on filtering the beam using the spatial filter 2c the beam spot size is further reduced. The combination of spatial filter 2c, beam expander 2b and the scanning lens can be applied to all the embodiments in the disclosed invention.

Figure 6:
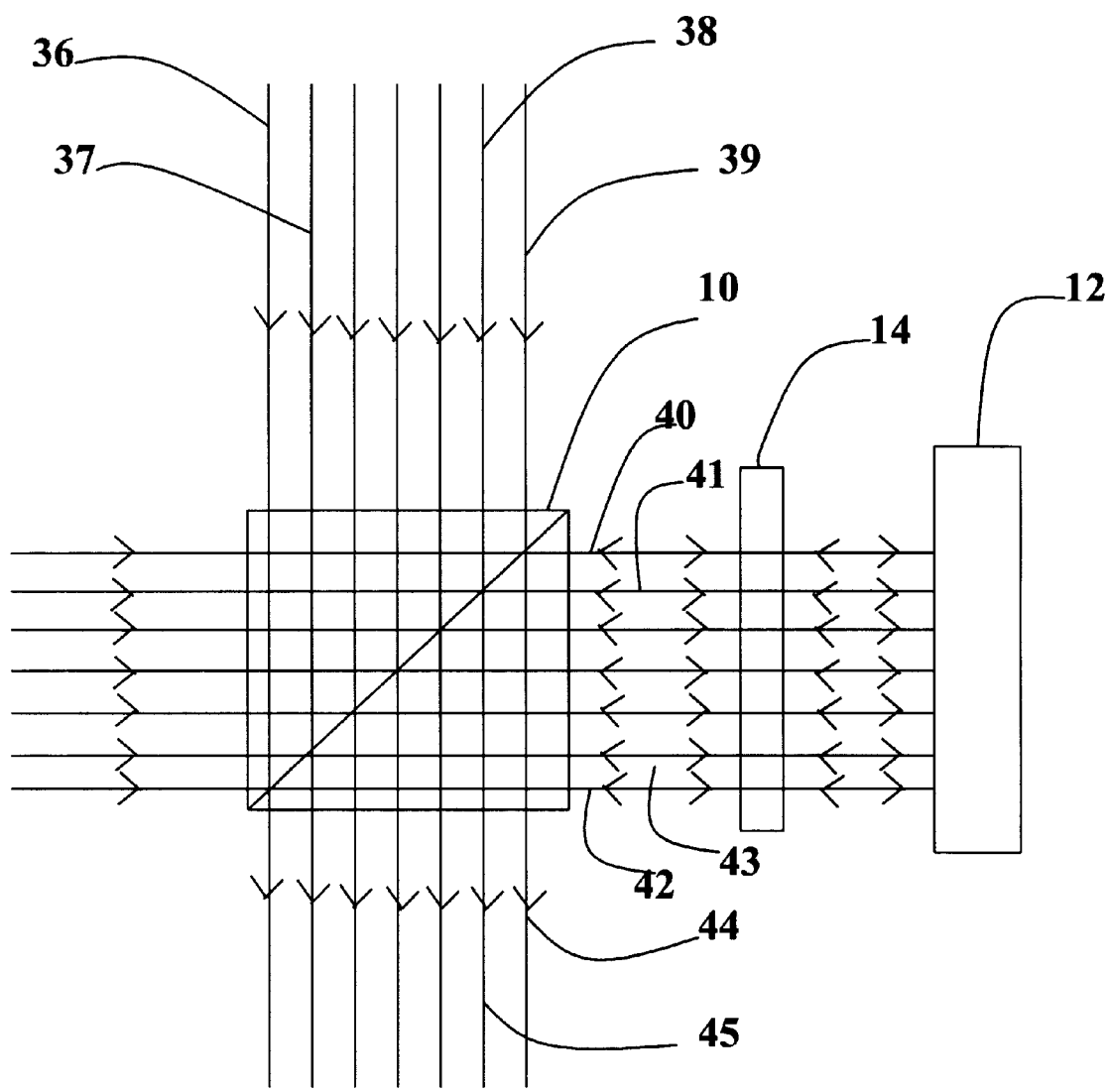
FIG. 6 is a drawing showing the interference method applied in the preferred embodiments of the invention.

The detailed description of the interference technique is as shown in FIG. 6. Similarly, the zero order beam 25 from the acousto optic modulator 3 preferably pass through a polarizing beam splitter 4 and is deflected preferably by 90 degrees. The deflected beam is turned preferably by the mirror 21 and passes through a collimating lens 8a of small focusing power, which is preferably of the same specification as the lens 7a. The lens 8a is placed such that the acousto optic deflector 6 is at the focal plane and the beam incident on the acoustic crystal at Bragg's angle. The scanning first order beams 30 and the zero order beam 31 then pass through the collimating lens 8b of the same specification as the lens 8a. The lens 8b is placed at the focal length from the acoustic crystal 6. The design is similar to the design shown in FIG. 4. The first order beam 30 from the acousto optic deflector 6 is deflected by the same angle as that of the first order beam 26 in the acousto optic deflector 5, since both the acousto optic deflectors 5 and 6 are driven by a common signal generator 51 as shown in FIG. 2. This process will eventually result in the collimating of the beam. The collimated laser beam 32 preferably passes through a beam splitter 10 and then passes through a wave plate 14, which may, for example, be a quarter wave plate. The effect of the wave plate 14 is to preferably shift the relevant polarization state of the laser beam. The reference surface 12 then reflects the beam, which may preferably be a mirror or reference object. The reflected beam then passes through the wave plate 14 thereby reversing the polarization and thus gets deflected by the beam splitter 10 where it interferes with the laser beam 100. The interference phenomenon involved in this invention is described in detail in FIG. 4.

FIG. 6 shows the detail interference phenomenon involved in this invention. Referring now to FIG. 6, laser beam 42 has minimum frequency shift $f_1$ induced and laser beam 43 is the next higher level of frequency shift $f_2$. Similarly the beam 40 has the highest frequency shift $f_n$ induced and beam 41 has the highest but one frequency shift $f_{n-1}$. All this frequency shift is with reference to the zero order beam 31 from the acousto optic deflector 6. The maximum and minimum frequency shift induced and the frequency difference between the adjacent scanning beam can preferably be varied depending on the scanning distance and the resolution of the scanning (number of resolvable spots) required for the application. Similarly, laser beam 36 has minimum frequency shift $f_1$ induced and laser beam 37 is the next higher level of frequency shift $f_2$. Similarly, the beam 39 has the highest frequency shift $f_n$ induced and beam 38 has the highest but one frequency shift $f_{n-1}$. All this frequency shift is with reference to the zero order beam 27 from the acousto optic deflector 5. The frequency shift induced in the laser beam 36 and 42 is the same since a common driver or signal generator drives both the acousto optic deflectors 5 and 6. Same is the case with beams 43 and 37, 45 and 38, 39 and 44, etc. Hence, at any point of time the scanning beams from the acousto optic deflector 5 interfere with the scanning beam from the acousto optic deflector 6, preferably in the polarizing beam splitter 10. Thus, the interfering beam 44, 45, etc. at any point of time in scanning will carry the frequency shift induced due to the dynamic movement of the object under investigation, since the frequency shift induced by the acousto optic device is canceled.

Frequency of the interference beam 44=Frequency of the laser beam 39—frequency of the laser beam 40=$F_0+F_B+F_{d1}\pm F_m-(F_0+F_{2d})$—(1) where $F_0$ is the frequency of the laser beam from the laser source 1, $F_B$ is the frequency shift induced due to the acousto optic modulator 3, $F_{d1}$ is the frequency shift induced in the acousto optic deflector 5 at a point in time, $F_m$ is the frequency shift induced due to dynamic motion of the object under investigation and $F_{d2}$ is the frequency shift induced due to acousto optic deflector 6. The frequency shift induced due to acousto optic deflector 5 $F_{d1}$ is the same as the frequency shift induced in the acousto optic deflector 6 $F_{d2}$ at any point of time during the scanning operation, since the two acousto optic deflector s5 and 6 are driven by the same driver or signal generator 51. Therefore, $F_{d1}=F_{d2}$ at any point in time. The equation (1) becomes= $F_B\pm F_m$ at any point in time while scanning. This interference beam 33 preferably passes through a collimator 17 and focuses at the optical window of the photo detector 19, which captures the interference signal.

The zero order laser beam 27 from the acousto optic deflector 5 is deflected preferably by the mirror 20. The zero order laser beam 31 from the acousto optic deflector 6 then preferably interferes with the laser beam 27 deflected by preferably the mirror preferably in the polarizing beam splitter 16. The laser beam 27 has a frequency=$F_0+F_B$. The laser beam 31 has a frequency=$F_0$. Therefore, the interference beam 34 has a frequency=$F_0+F_m-F_0=F_B$.

The photo detector 18 captures this interference beam. The photo detectors 18 and 19 are of high-speed type. An array of photo-detector or photo-detector having a wide optical window can be applied, which will eliminate the need for focusing the beam on to the photo-detector using the focusing lens 17.

The photo detectors 18 and 19 are preferably connected to the reference and measuring port of the signal processor 61. The signal processor measures the frequency difference between the measuring signal from the photo detector 19 and the reference signal from photo detector 18 preferably by a phase estimation technique, acting as a phase meter. Another alternative phase estimation technique suitable for the method of present invention is heterodyne interferometry. The signal processor 61 preferably is able to measure the dynamic information in range of nanometers or even sub-nanometers by adopting different techniques. The data from the signal processor 61 is then captured by the data capture 58, which is in turn preferably controlled by a computer 58. The overall computer controller 59 controls the data capture 58 and the controller 57 for the signal generator 51 simultaneously. The data will be captured corresponding to the programmed scanning spots. Moreover, the number of captured data spot can be varied depending on the accuracy required and the capture rate can be varied depending on the scanning rate and the number of resolvable spots for a programmed scan length as required for the application. The computer controller 57 can preferably control various parameters of scanning such as number of resolvable spots for a programmed length, the scan angle by preferably varying the maximum and minimum frequency input (bandwidth of scanning) to the acousto optic deflectors 5 and 6 from the signal generator 51, scanning rate (the sweeping time), etc. The overall computer controller 59 will automatically or at option of the user will control the data capture 58 depending on the scanning parameters inputted. The dynamic parameters of the resulting information are displayed on the display 60. Also, the controller can control the power amplifiers 53 and 54, thereby varying the intensity of the beams from the acousto optic deflectors 5 and 6 independently.

Figure 7:
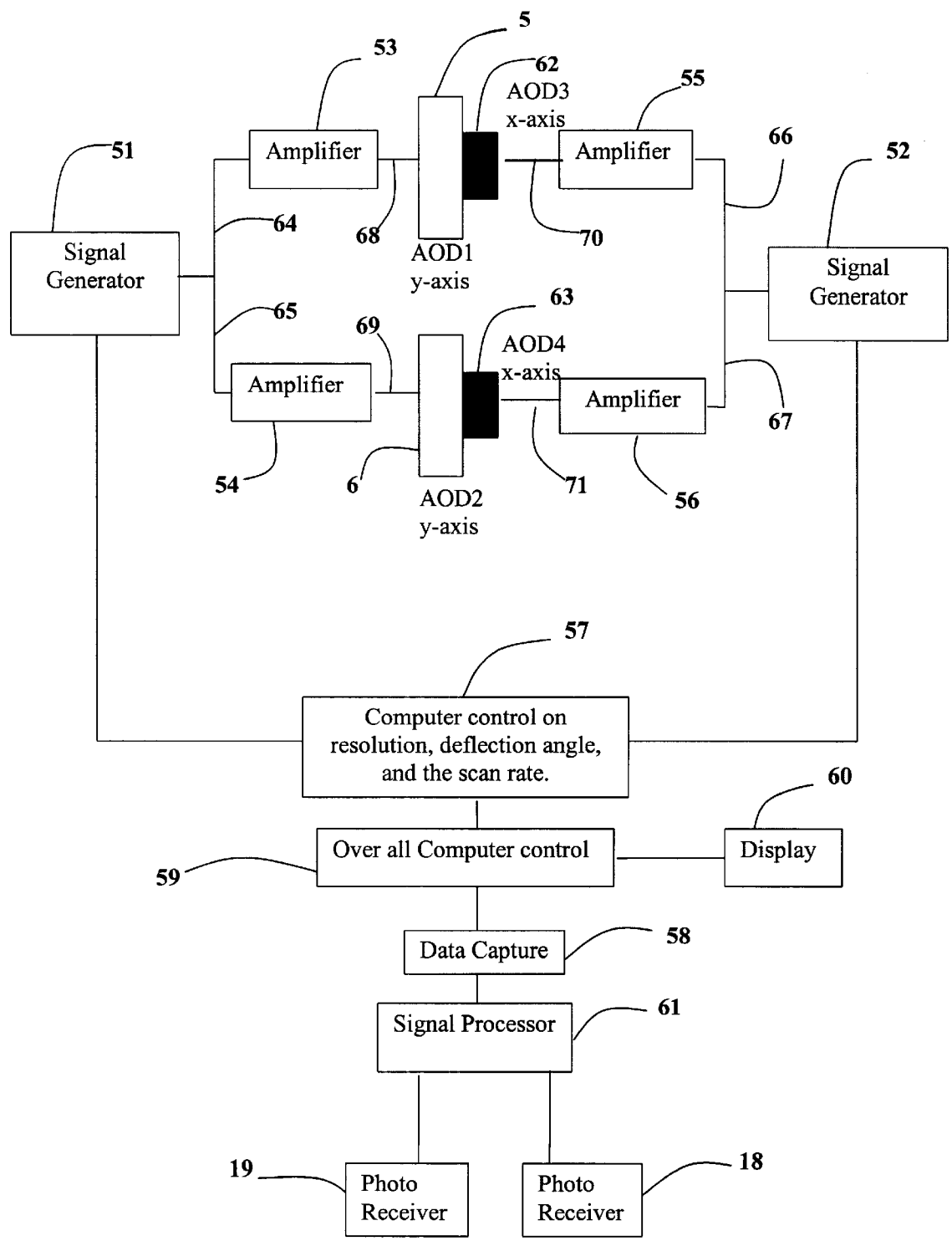
FIG. 7 is a drawing showing the layout of the scanning system, signal processing system and the control system for scanning and data capturing for two axis scanning using four acousto optic deflector for heterodyne and homodyne system.

The embodiment can be preferably modified to two axis scanning. The modification in the preferred embodiment of the invention will be described with reference to the accompanying drawing. In this scanning technique, an area can be scanned due to its two axis scanning nature rather than a line scanning along a single axis. In two axes acoustic optic deflector circuitry shown in FIG. 7, it preferably involves two signal generators 51 and 52. Signal generator 51 is preferably for Y-axis scanning and signal generator 52 for X-axis scanning. The highly stable frequency sinusoidal signal from signal generator 51 is split in to two equal stable sinusoidal frequency signals 64 and 65 which have preferably the same intensity, stability and frequency. Similarly, the highly stable sinusoidal frequency signal from signal generator 51 is split in to two equal stable sinusoidal frequency signals 66 and 67 having preferably the same intensity, stability and frequency. Power amplifiers 53 and 54 of preferably the same specification amplify the frequency signals 64 and 65, by the same power. Similarly, power amplifiers 55 and 56 of preferably the same specification amplify the frequency signals 66 and 67, by the same power. The power amplified stabilized sinusoidal frequency signals 68 and 69 from the power amplifiers 53 and 54 drive the two acoustic deflectors 5 and 6. Similarly, the power amplified stabilized sinusoidal frequency signals 70 and 71 from the power amplifiers 55 and 56 drives the two acoustic deflectors 62 and 63. The acousto optic deflector 5 and 6 preferably for Y-axis deflection of the laser beam are preferably made with the same specifications for frequency bandwidth, acoustic crystal material, acoustic wave wavelength, acoustic wave velocity and the dimension of the acoustic crystal and the transducer. Similarly, acousto optic deflectors 62 and 63 preferably for X-axis deflection of the laser beam are preferably made with the same specifications for frequency bandwidth, acoustic crystal material, acoustic wave wavelength, acoustic wave velocity and the dimension of the acoustic crystal and the transducer. The acoustic crystal in the acousto optic deflectors 5 and 6 is perpendicular to the acousto optic crystal in the acousto optic deflectors 62 and 63, respectively. Thus, the acousto optic wave in the acousto optic deflectors 62 and 63 move in a direction perpendicular to the acoustic wave in the acousto optic deflectors 5 and 6, respectively. Also, the acousto optic deflectors 62 and 63 is aligned to acousto optic deflectors 5 and 6, respectively, such that the first order deflected beam from the acousto optic deflectors 5 and 6 incident on the acoustic wave in the acoustic crystal of the acousto optic deflectors 62 and 63, respectively, at preferably Bragg's angle. This design will enable two-axis deflection of the laser beam. The scan distance in the X- and Y-direction depends on the frequency bandwidth of the acousto optic deflector employed for X- and Y-axes deflection, respectively.

The controlling system of the two axis scanning is as described in the previous embodiment, but here there are two-signal generators 51 and 52 for two axes scanning rather than one. The system may preferably be employed for micro device inspection on dynamic parameters. The focusing spot size applying the combination of spatial filter 2c, beam expander 2b and scan lens 131 or beam reducer 2b of magnification power depending on the resolution. There is only one scanning beam at one point of time, which is shown as multiple beams in all the drawings for better understanding.

Alternative of the First Embodiment

Figure 8:
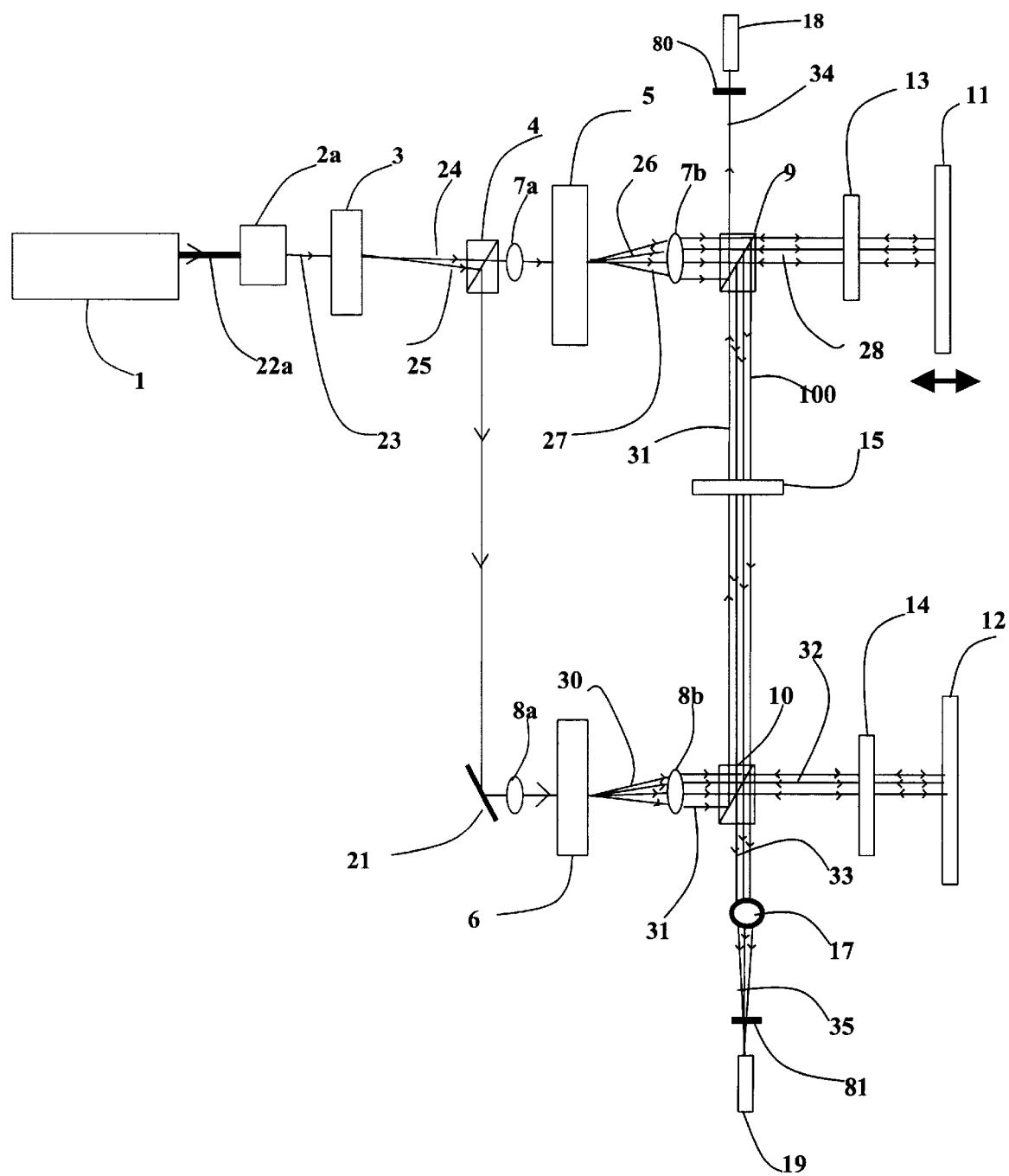
FIG. 8 is a drawing showing the layout of the scanning system for heterodyne technique for improving the accuracy of the system for the alternative of the first preferred embodiment of the invention.

Referring to FIG. 8, the mirror 20 and the polarizing beam splitter 16 are eliminated to improve the accuracy of the system. Here, a common polarizing beam splitter 9 is applied for the beams 26 and 27. Similarly, beams 30 and 31 pass through a common polarizing beam splitter 10. The zero order beam 31 from the acousto optic deflector 6 will be deflected by 90 degrees by the polarization beam splitter 10 due to its state of orthogonal polarization with respect to the first order scanning beam. The deflected beam 31 on passing through the wave plate 15, which is preferably a half-wave plate, changes the polarization state of the beam. The beam passes undeflected by the polarizing beam splitter 9. The zero order beam 27 from the acousto optic deflector 5 is deflected by the polarizing beam splitter 9 by 90 degrees and then interferes with the beam 31 on passing through a polarizer 80. The interference beam is then captured by the photo-detector 18. These will eventually improve the accuracy of the system, since the interference signals 34 and 35 will have the nearly same error induced due to vibration and hence cancel each other. This system can be applied to other embodiments in the present invention so as to improve the accuracy of the system.

Second Embodiment of the Present Invention

Figure 9:
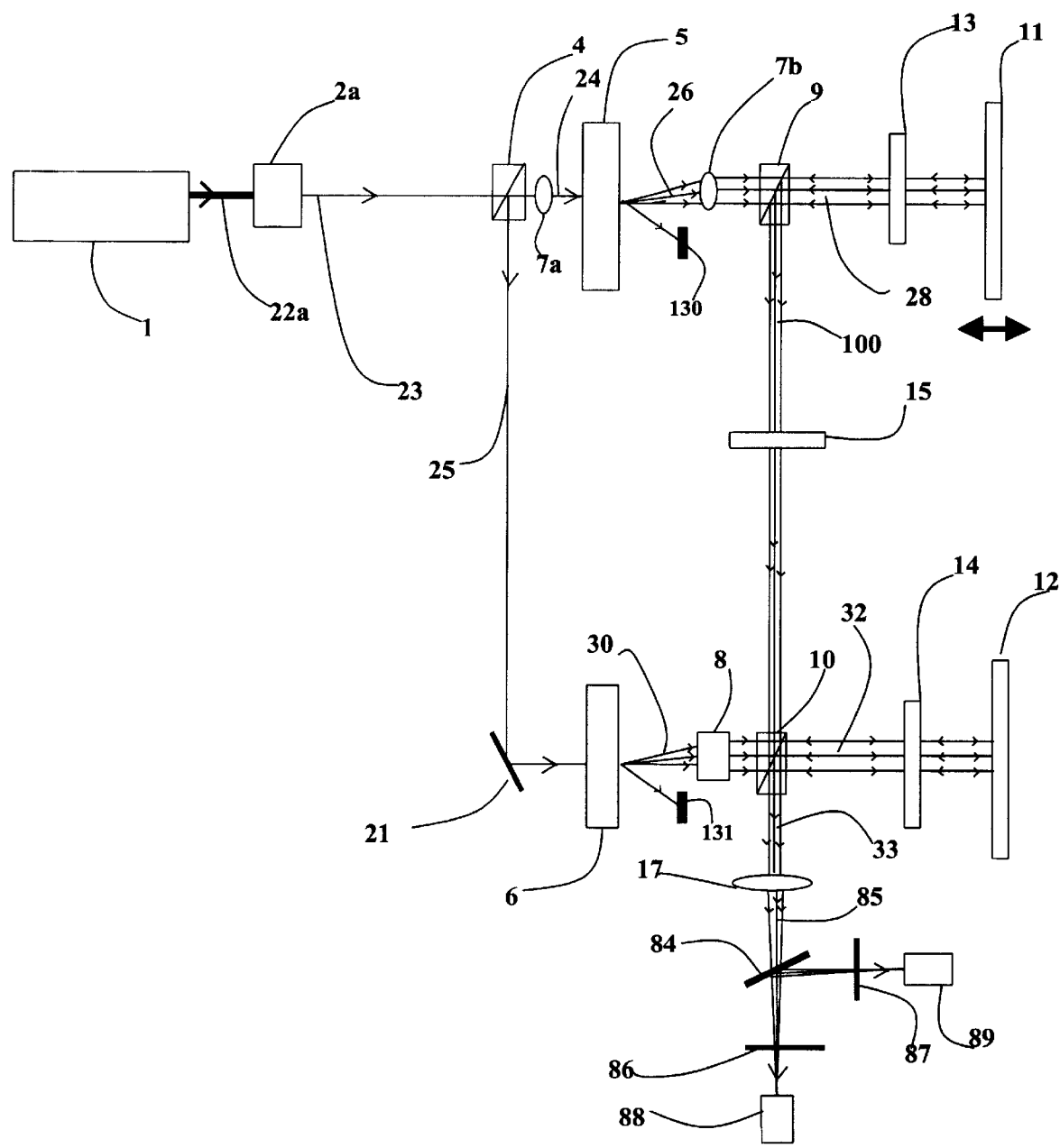
FIG. 9 is a drawing showing the homodyne acousto optic scanning vibrometry set up using double acousto optic deflectors for the second preferred embodiment of the invention.

Referring to FIG. 9 the first embodiment can be modified to homodyne interferometry where the beam 22a from the laser source is circularly polarized rather than linearly polarized as in the first embodiment. The circularly polarized beam 22a from the laser source 1 is preferably reduced in its beam size on passing through a beam reducing device. The reduced beam 23 splits into two orthogonal polarized beams 24 and 25 on passing through preferably a polarizing beam splitter 4. Here the need for frequency modulation using acousto optic modulator 3 is eliminated as in first embodiment. The rest of the optical path and the interference phenomenon are as in the first embodiment. Moreover, the zero order beam from the acousto optic modulators 5 and 6 is blocked by surfaces 130 and 131.

Here the frequency of the interference beam 44=frequency of the laser beam 39—frequency of the laser beam $40 = F_0 + F_{d1} \pm F_m - (F_0 + F_{d2})$—(2) as explained in the first embodiment $F_{d1} = F_{d2}$ at point of time in scanning, therefore, equation (2) is reduced to $= \pm F_m$, which is the frequency of the interference, beam 44 (same as the case for other scanning interference beam). The signal processing technique applied is preferably quaderature signal processing technique or another homodyne technique. The driving and control mechanism of the acousto optic deflector and data capturing for single axis and two axes scanning is same as in the first embodiment of the invention.

Figure 10:
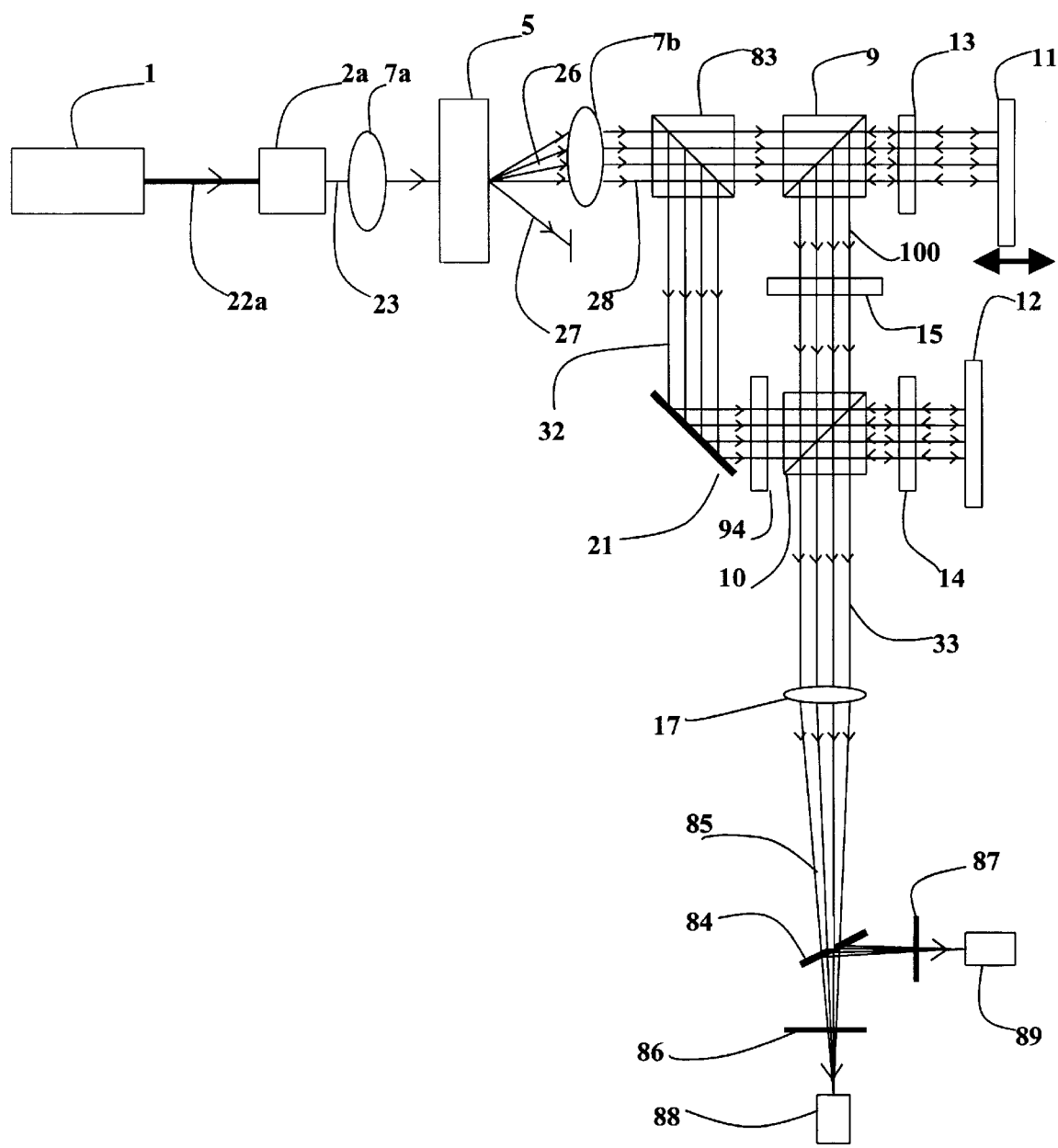
FIG. 10 is a drawing showing the homodyne acousto optic scanning vibrometry set up using a single acousto optic deflector for the third preferred embodiment of the invention.

Third Embodiment of the Present Invention—Homodyne System Adopting a Single Acousto Optic Deflector Referring to FIG. 10, the laser beam 22a is of preferably linear polarization from the laser source 1, which is preferably frequency stabilized of preferably 638.2 nm wavelength. The laser beam preferably passes though a beam reducer 2a, which preferably performs the operation of the beam expander of minimum divergence in the reverse manner. The beam reducer preferably of a collimating type, may be of different reducing power depending on the precision of measurement, the size of the structure and the complexity of the structure under investigation. The beam reducer preferably has a long focal length and minimal divergence of the beam so as to maintain constant size of the beam over the entire optical path. The reduced beam 23 is incident at the acousto optic deflector 5 at preferably Bragg's angle. The beam, preferably the first order beam 26, is deflected at an angle depending on the frequency signal input to the acousto optic deflector from the signal generator or driver. The zero order beam 27 is blocked to prevent any further propagation by a suitable media. By varying the frequency signal input, scanning laser beam 26 is obtained. The scanning laser beam 26 preferably passes through a collimating lens 7a of small focusing power, as in the previous embodiment, which preferably focuses the beam onto the acousto optic deflector 5. The collimated laser beam 28 obtained on passing through the focusing lens 7b placed at the focal distance from the acousto optic deflector will preferably pass through a non-polarizing beam splitter 83 and splits into two scanning beams 99 and 32 of nearly equal intensity in the perpendicular direction. The beam 99 passing through the polarizing beam splitter 9 and preferably passes through a wave plate 13, which may, for example, be a quarter wave plate. The effect of the wave plate 13 is to preferably shift the relevant phase of the laser beam. The beam after passing through wave plate 13 scans the target under investigation 11 over a distance depending on the control in frequency signal induced in the acousto optic deflector 5 by the computer controller 57. The measuring beam 100 then gets deflected from the object under investigation 11 and preferably passes through the same wave plate 13, thereby preferably reversing the polarization of the laser beam. The reflected beam then preferably pass through the beam splitter 9 and may be deflected by 90 degrees due to a change in the polarization angle of the laser beam. The deflected measuring beam 100 may preferably pass through a wave plate 15, which may, for example, be a half wave plate. The beam 32 reflected by the non-polarizing beam splitter 83 and may be deflected by a mirror 21 and pass preferably through a polarizing beam splitter. The beam then propagates through preferably a quaterwave plate 14 and gets reflected back by a plane mirror or reference surface 12. The reflected reference beam than passes preferably through the same quarter-wave plate and may interfere with the measuring beam 100 in the polarizing beam splitter 10. The interference beam 33 focuses on passing through a focusing lens 17 preferably a collimating lens. The focusing beam 85 focuses on the optical window of the photo-detectors 88 and 89 on preferably passing through a polarizing beam splitter 84 and polarizers 86 and 87. The quaderature signal is then retrieved from the two photo-detectors 88 and 89. Other homodyne detection techniques may also be applied for capturing the interference signal.

Figure 11:
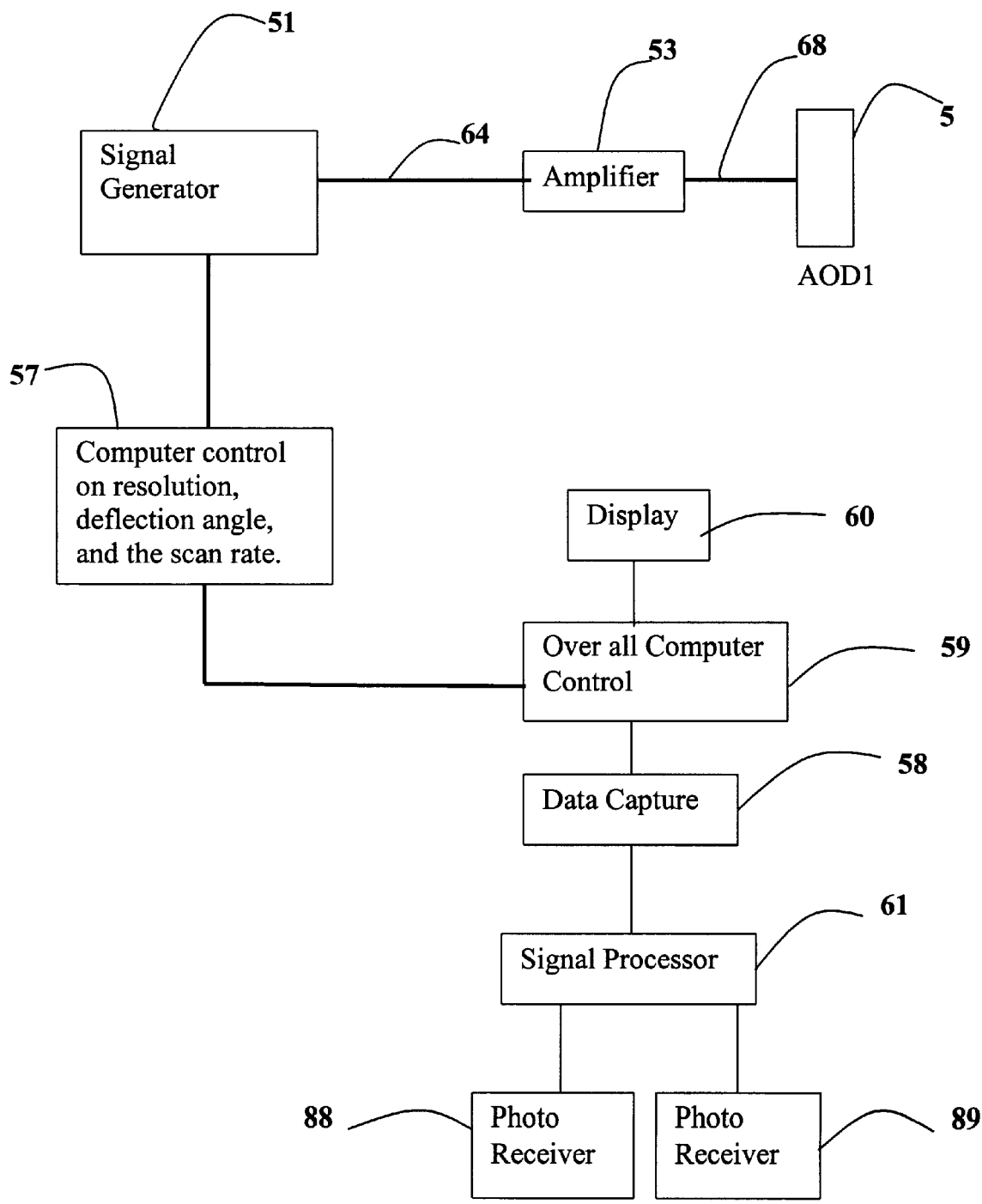
FIG. 11 is a drawing showing the layout of the scanning system, signal processing system and the control system for scanning and data capturing for single axis scanning using single acousto optic deflector for homodyne system.

Referring to FIG. 11, the driving and controlling mechanism of the acousto optic deflector 5 is same as in the first embodiment except that here we employ a single acousto optic deflector 5 and amplifier 53 instead of two acousto optic deflectors (5 and 6) and two amplifiers (53 and 54) as in first embodiment. Here the signal generator 51 drives a single acousto optic deflector 5. The signal processing system employs a homodyne detection technique preferably of quaderature signal processing. The data capturing and overall control system is preferably similar to the first embodiment of the present invention.

Figure 12:
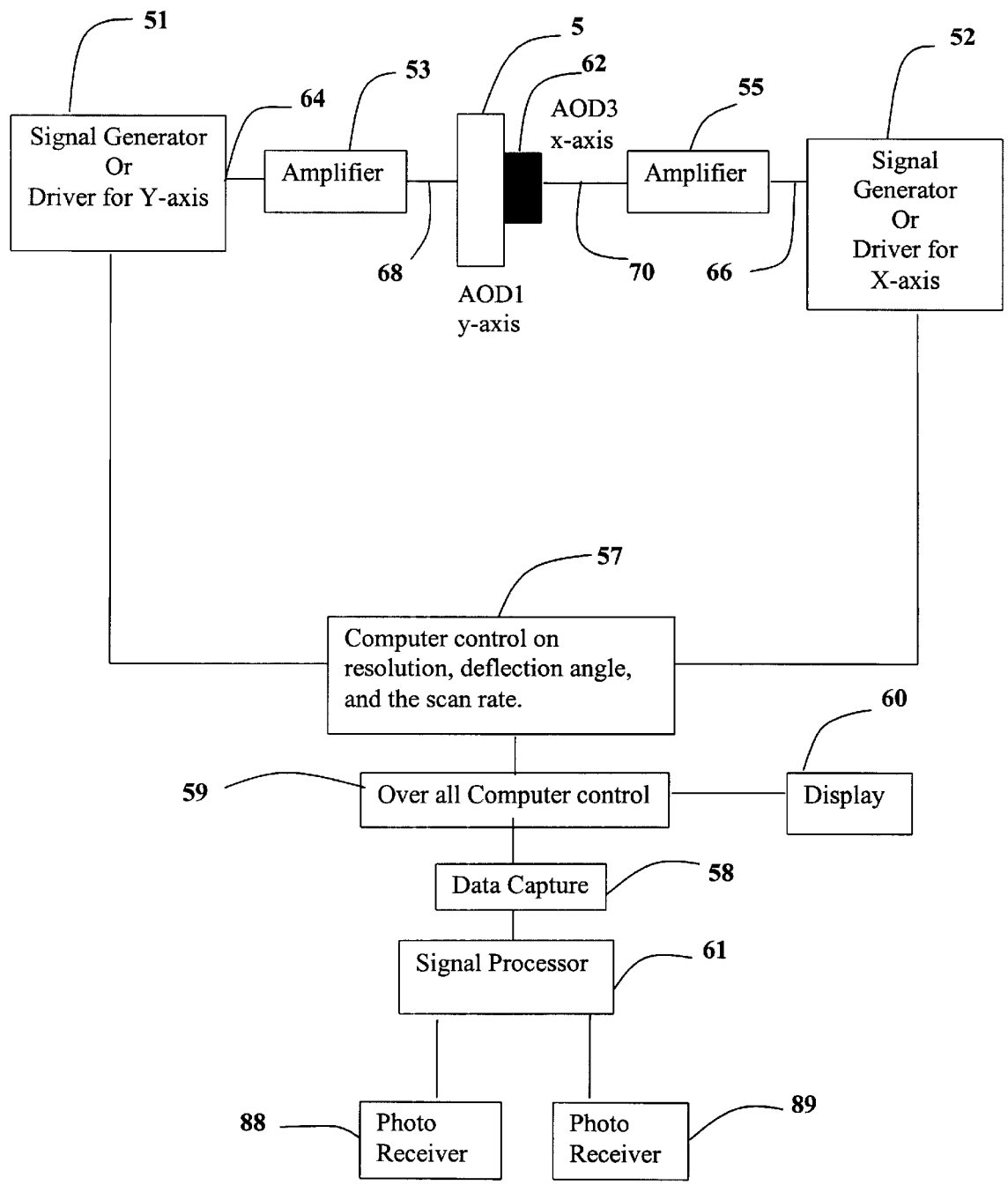
FIG. 12 is a drawing showing the layout of the scanning system, signal processing system and the control system for scanning and data capturing for two axis scanning using two acousto optic deflector for homodyne system.

Referring to FIG. 12, for double axis scanning only one acousto optic deflector is employed for scanning along each axis instead of four in the previous embodiment. Acousto optic deflector 5 for Y-axis scanning and acousto optic deflector 62 for X-axis scanning which are driven by independent signal generators 51 and 52. Similarly, the number of amplifiers are also reduced to two 53 and 55. As scanning control and the data capturing control and the overall control system is same as in previous embodiment. The signal processing technique is homodyne rather than heterodyne.

The embodiments of the present invention can be applied for analyzing the dynamic characteristics of the hard disk, optical disk, micro devices, macro components, etc. All these embodiments benefit from the advantages of the disclosed invention which include the following. The present invention has the ability to scan the measuring beam on to the target accurately at very close scanning points, since the beam is not subjected to vibration as in other approaches such as servo controlled mirror driving scanning system and in other mirror driving scanning systems which degrade the accuracy of the vibration measurement. The resolution of scanning (number of resolvable spots in scanning) in laser scanning the vibrometer system is enhanced compared to other approaches due to the fact that for each of the frequency input to the acousto optic deflector from the signal generator there is a distinct scanning point. Thus the number of points measured on the target surface is significantly increased which enhances the accuracy of the information that can be derived. The preciseness and accuracy of scanning in laser scanning vibration measuring systems is enhanced due to the fact that it involves no mechanical movement in scanning the laser beam as in other approaches such as mirror driven scanning system. The rate of scanning or scanning speed or the sweep rate is increased compared to mirror driven scanning (rotating polygonal mirror, tilting mirror, etc.) vibration measuring system. The present invention overcomes the problem of optical path difference at each of the scan points due to deflection of the beam. In the present invention, due to the application of parallel scan beam, the optical layout is designed such that the optical path of the beam is the same at all scanning positions. In the present invention, the scanning beams are parallel to each other and incident on the measuring target as a parallel beam at a nearly perpendicular angle to the target surface at all scan angles as compared to other approaches which involve misalignment of beam on the target surface by a factor which varies with the scanning angle.

Figure 22:
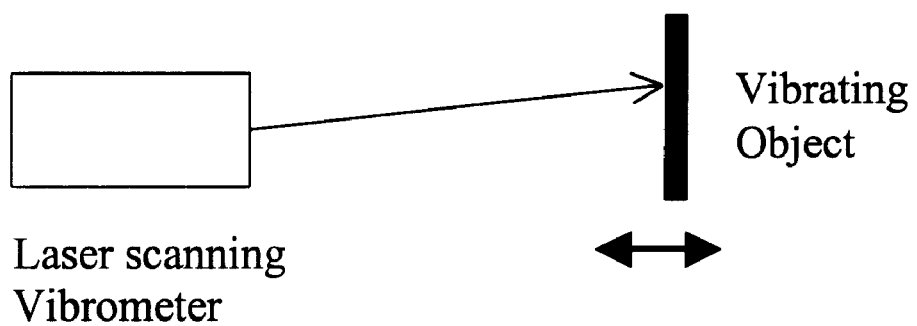
FIG. 22 is a drawing showing the error induced due to misalignment of the laser beam on the target.
Figure 22:
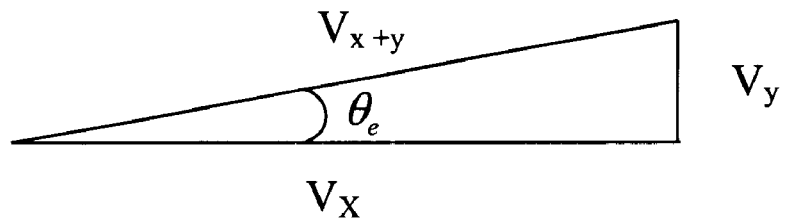

Therefore, other approaches of scanning in vibration measurement will result in the measurement of vibration which is the not the useful vibration quantity to be measured as shown in FIG. 22. Where $V_x$ is the velocity vector along the X-direction which is the useful velocity to be measured, i.e., the velocity of the vibrating target in the direction parallel to the direction of the laser beam. $V_y$ is the velocity component in the direction perpendicular to the direction of the laser beam (which we do not intend to measure). Due to the tilt in incident beam the vibration measured is the resultant velocity vector $V_{x+y}$ instead of $V_x$. The resultant velocity we obtain by measurement is given by $$V_{X+Y} = \frac{V_X}{\cos\theta_e}$$

where $V_x$ is the velocity to be measured. Moreover, the scanning angle $\theta_e$ is different at different scanning points, which makes it more difficult to mathematically eliminate the error in the final measurement. In the present invention the above problem is nearly eliminated on applying parallel scanning beams perpendicular to the target surface.

Fourth Embodiment of the Present Invention—Fly-height Measurement

The present invention can also be applied to a method of measuring the fly-height accurately of a magnetic head at high-speed rotation of the magnetic disk and can also be applied for measurement of small spacing. Here the system acts as a differential interferometer by measuring the relative displacement of the slider head with reference to the disk surface.

Figure 13A:
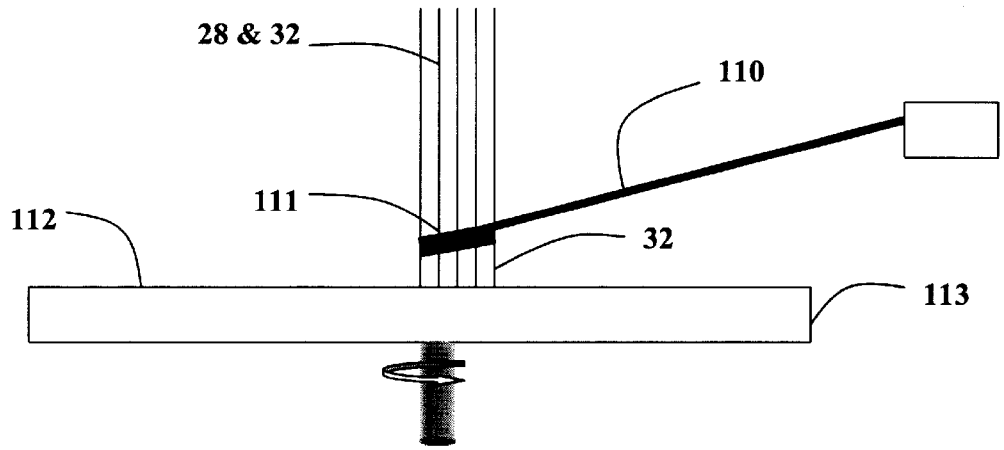
FIG. 13a is a drawing showing the technique of measuring the least fly-height in the X-direction by X-axis scanning.
Figure 13B:
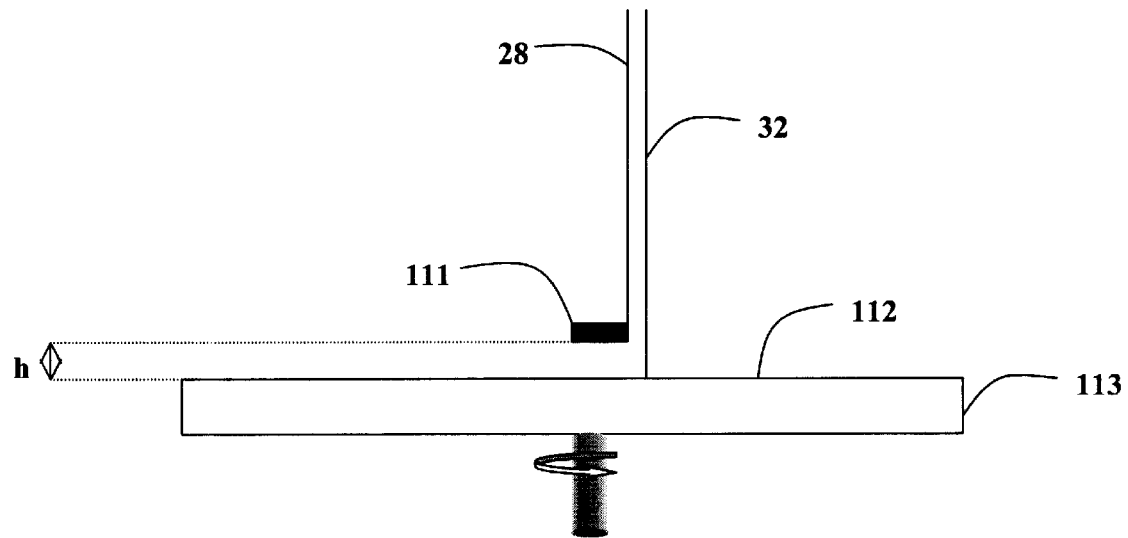
FIG. 13b is a drawing showing the side view of FIG. 14.

FIG. 13a and FIG. 13b shows the preferred description of the embodiment where the parallel beam 28 preferably scans along the X-direction and strikes the surface 111 of the test object 115 and gets reflected back. Similarly, the parallel beam 32 preferably scans in the X-direction (same scanning direction as the beam 28) strikes the surface 112 of the rotating disk 113 and gets reflected back.

On referring to FIG. 13a and FIG. 13b for a heterodyne system the laser beam 39 has a frequency=$F_0+F_B+F_{d1}\pm F_{h1}$ where $F_{h1}$ is the frequency shift induced due to dynamic motion of the test object preferably the slider head. Similarly, the laser beam 40 has a frequency=$F_0+F_{d2}\pm F_{h2}$ where $F_{h2}$ is the frequency shift induced due to dynamic motion of the disk surface. Therefore, the frequency of the interference beam 44=$F_0+F_B+F_{d1}\pm F_{h1}-(F_0+F_{d2}\pm F_{h2})$—(3)= $F_B\pm F_{h1}\pm F_{h2}$ (Since $F_{d1}=F_{d2}$ at any point of time) which is captured by the photo detector 19. The frequency of the interference signal captured by the photo detector 18=$F_B$. Therefore, on subtracting the two signals from the photo detectors 18 and 19, the resulting signal will give the estimation of the distance between the disk surface and the slider head 'h'. h=$\pm F_{h1}-(\pm F_{h2})$. The change in phase angle of the measured signal in the photo detector 18 and 19 is the distance between the disk surface and the slider head For an homodyne system equation (3) can be rewritten as=$F_0+F_{d1}\pm F_{h1}-(F_0+F_{d2}\pm F_{h2}) = \pm F_{h1}\pm F_{h2}$.

Figure 13C:
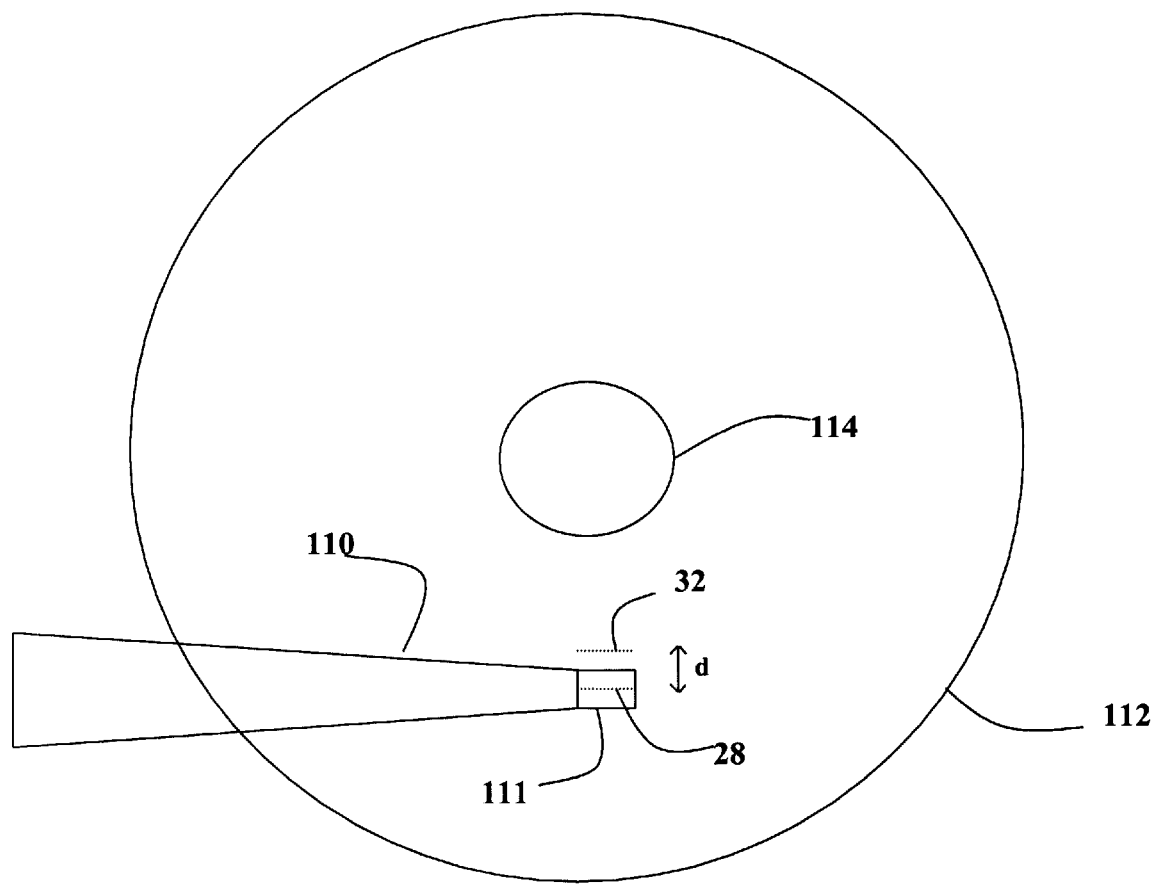
FIG. 13c is a drawing showing the top view of FIG. 14.
Figure 14:
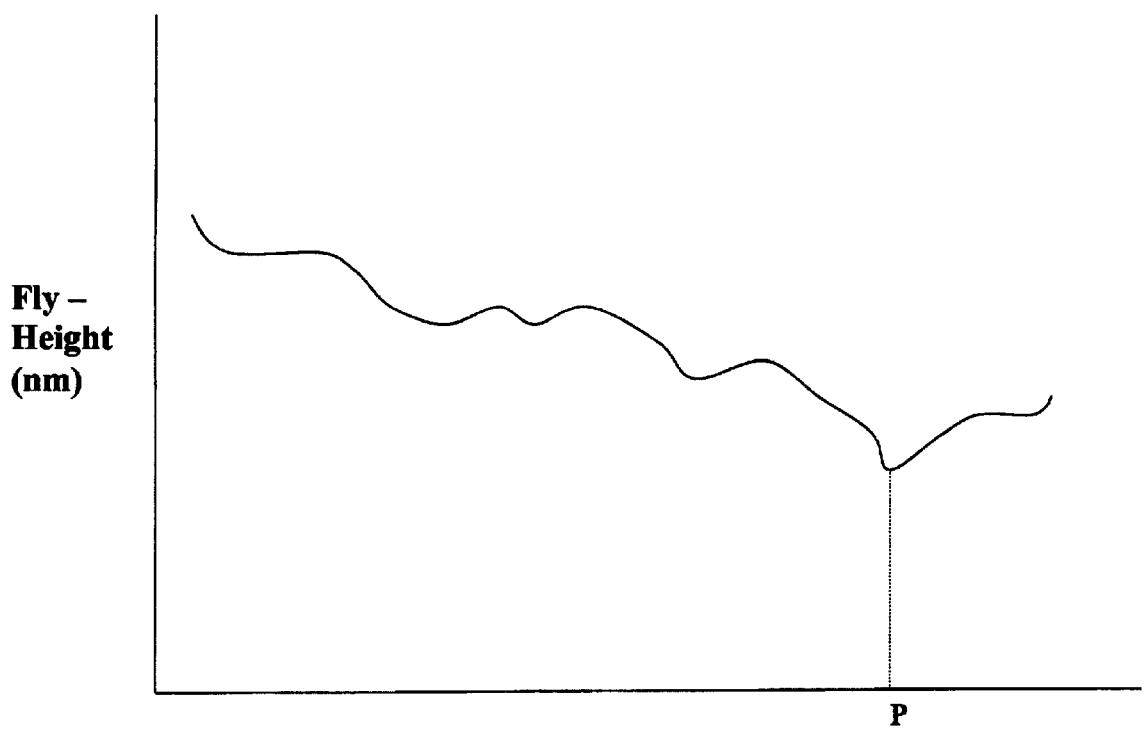
FIG. 14 is a graph showing the fly-height while scanning in X-axis.

The distance d shown in FIG. 13c between the two scanning beams 28 and 32 is made as small as possible to minimize the error. The data is recorded for each of the scanning points for a required period and the differential data preferably the fly-height is averaged for each of the scanning points along the X-direction and plotted as shown in FIG. 14. And from the graph, the point at which the fly-height is minimum (point P) is sighted preferably by the software. The fly-height behavior at each point can also be analyzed individually.

Figure 16:
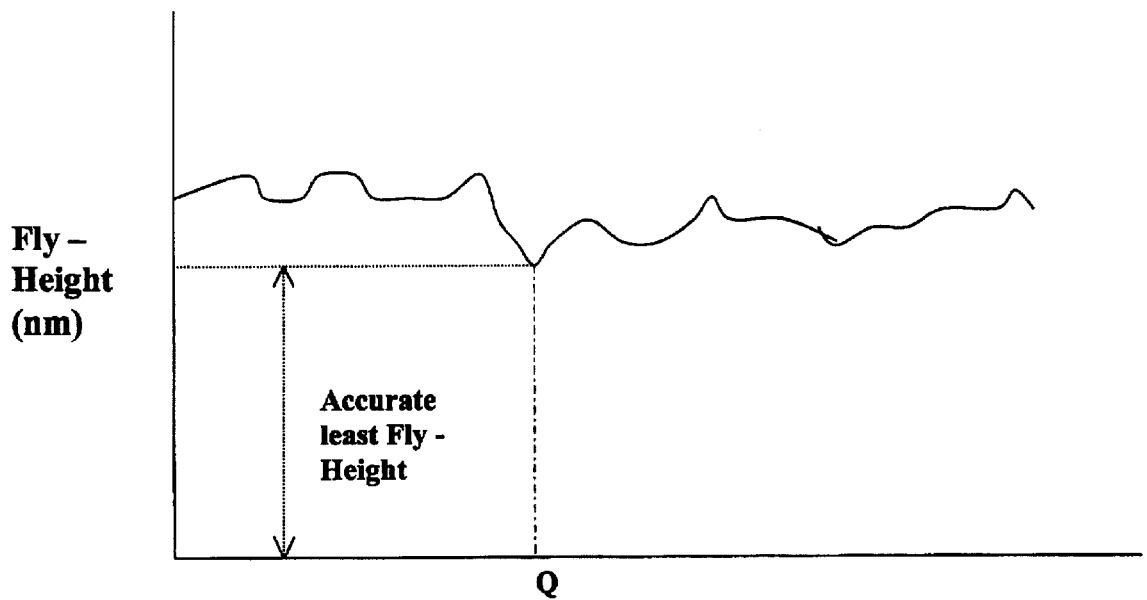
FIG. 16 is a graph showing the fly-height while scanning in Y-axis at the point of least fly-height on the X-axis.
Figure 15A:
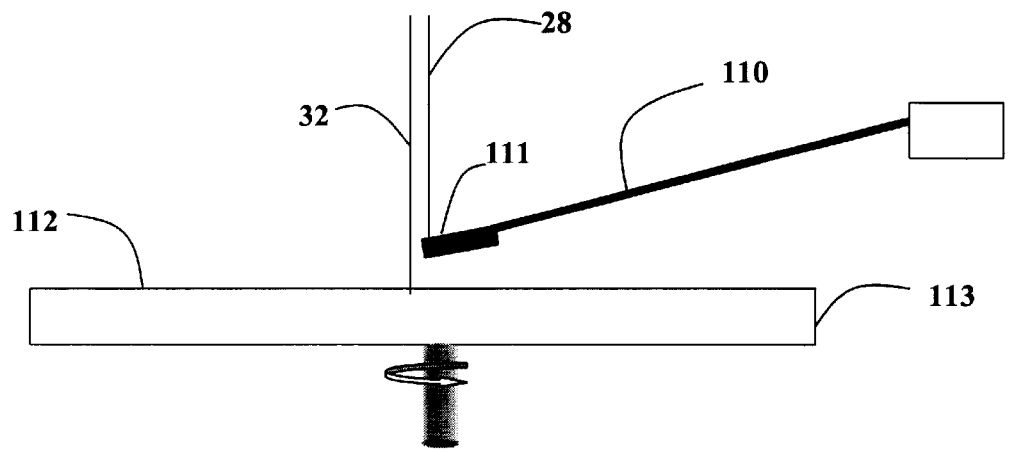
FIG. 15a is a drawing showing the technique of measuring the least fly-height in the Y-direction by Y-axis scanning.
Figure 15B:
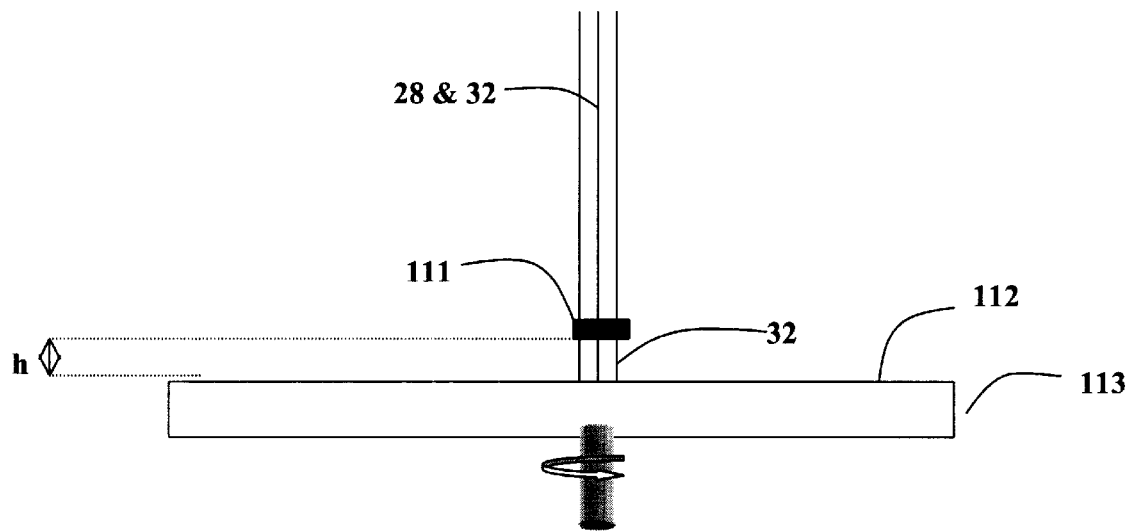
Figure 15C:
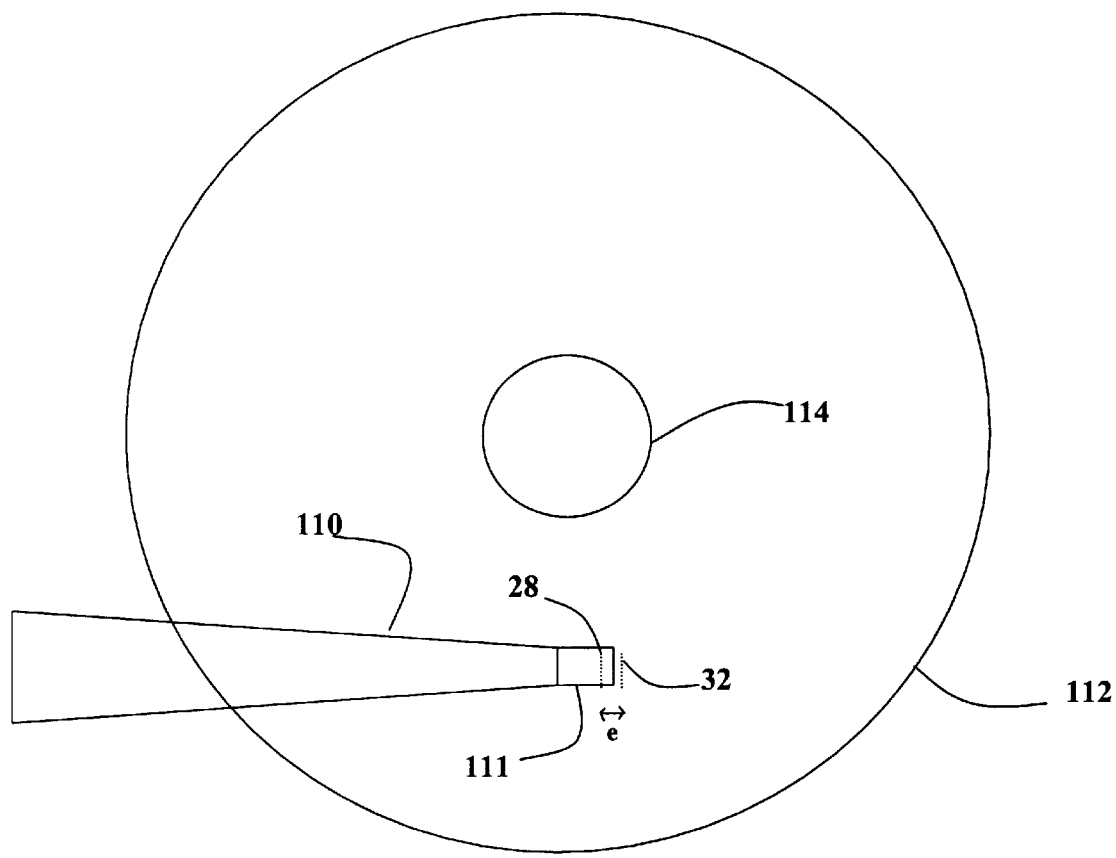

Now the two beams 28 and 32 scan in the Y-direction as shown in FIG. 15a and FIG. 15b. The beam 28 scanning along the point P in the Y-direction strikes the surface 111 of the test object 115 and gets reflected back. The beam 32 scans parallel to the beam 28 in the Y-direction and strikes the surface 112 of the rotating disk 113 and gets reflected back. The distance e shown in FIG. 15c between the two scanning beams 28 and 32 is made as small as possible. The data is captured for several scanning points and preferably averaged or analyzed for each of the scanning points. From the averaged fly-height of FIG. 16 or analyzing the individual graphs on the points along the point P perpendicular to the initial scanning direction the point Q at which the fly-height is minimal can be determined. This will eventually provide accurate information on the minimal fly-height details. The beam scanning is automatically programmed from one point to next and does not require manual data input on the scanning point, which is also otherwise possible. The optical layout and the technique of the first, second and third embodiments can be applied for the measurement of fly-height.

The principle advantages of the fourth embodiment of the present invention, on the measurement of fly-height on hard disk in addition to the above mentioned advantages 1–6 in the previous embodiments are: The present invention determines the fly-height information over the entire area of slider head by two axis scanning capability, which is essential since the slider is flying obliquely. This leads to accurate measurement of the least fly-height information on the hard disk. Other approaches use a single beam or a multiple beam approach that will not lead to the determination of the least fly-height information of the hard disk due to restricted number of measuring points which leads to ambiguity of the measured result. The present invention can be applied for production line measurement of fly-height information since it operates on a real disk drive rather than a transparent disk as in case of other approaches. Moreover, the problem of refractive index change in the material in other system is also overcome. The problem of alignment of the beam is overcome due to the application of parallel scanning beam perpendicular to the surface of measurement. Other approaches involve measuring beam at an angle to the surface of the disk and the slider head, which will eventually result in misalignment error.

Figure 17:
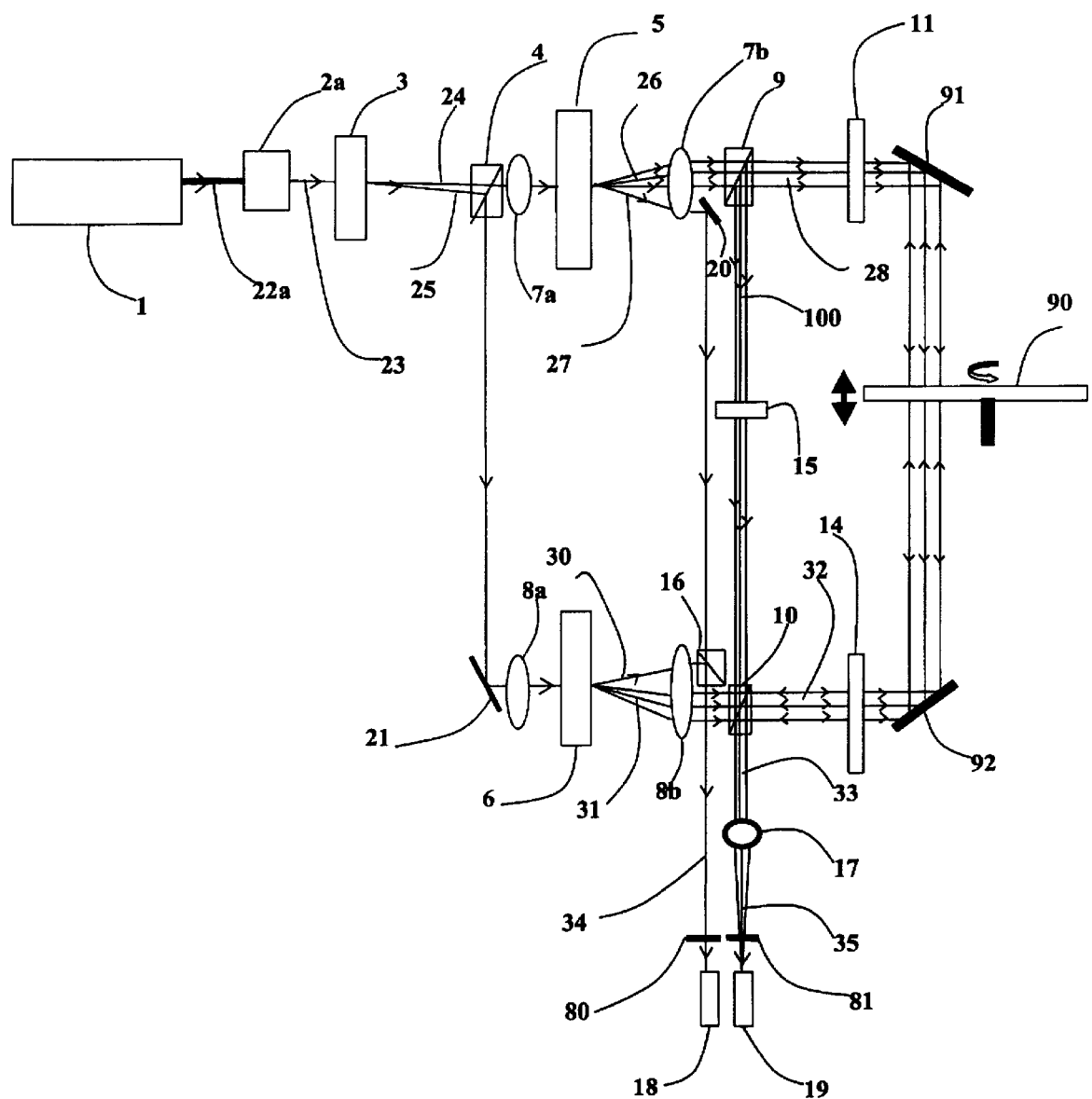
FIG. 17 is a drawing showing the heterodyne acousto optic scanning vibrometry set up for measuring dynamic parameters of rotary target for the fourth preferred embodiment of the invention.
Figure 18:
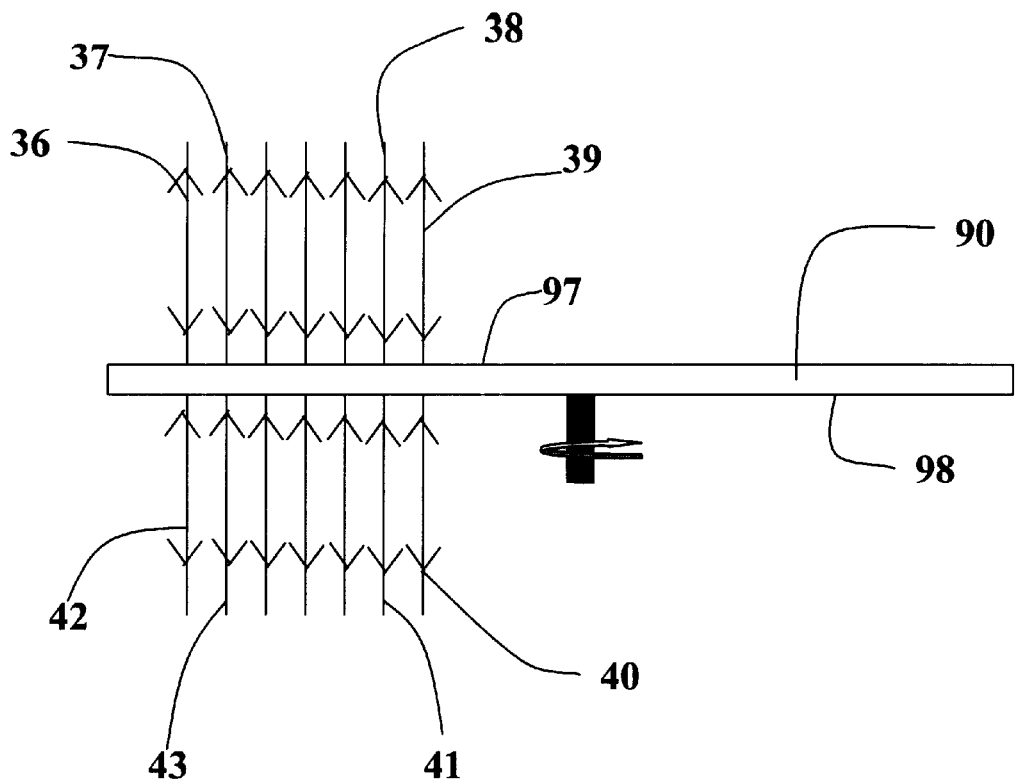
FIG. 18 is a drawing showing the frequency shift induced in the measuring scanning beams on either surface of the rotating target.

Fifth Embodiment of the Present Invention—Rotary Object Measurement to Eliminate Pseudo Vibration Measurement of dynamic parameters of rotary object is carried out by modifying the first embodiment for heterodyne measurement as shown in FIG. 17. In this case the acousto optic deflector 6 is in the opposite direction of the acousto optic deflector 5 so as to make the acousto optic wave in acousto optic deflector 6 travel in an opposite direction to the acousto optic wave in the acousto optic deflector 5. Hence, the direction of the zero order beam 30 and the first order scanning beam 31 emerging from the acousto optic deflector 6 is inverted with respect to that of the zero order beam 27 and first order scanning beam 26 emerging from the acousto optic deflector 5 as seen in FIG. 17. The two beams 28 and 32 acts as a measuring beam rather than measuring beam 32 and reference beam 28 as in the previous embodiment. Referring to the previous embodiment, the beam 28 on passing through the polarizing beam splitter 9 and the wave-plate 11 is deflected by the mirror 91 on to the rotating target surface. Similarly, the beam 32 on passing through the polarizing beam splitter 10 and wave-plate 14 is deflected by the mirror 92 on to the rotating target 90. The important factor is the alignment of the two beams 28 and 32 on the target surfaces 97 and 98 since the vibration information is different at different target point. The alignment is as shown in FIG. 18 where the scanning beam 38 (first point of measurement) and the scanning beam 42 hits the target at the same point on sides 97 and 98 of the target 90. It is the same case with beam 37 and 43, 38 and 41, 39 and 40, etc. Therefore, there are two measuring beams on either side of the target point on the surface 97 and 98.

Figure 19:
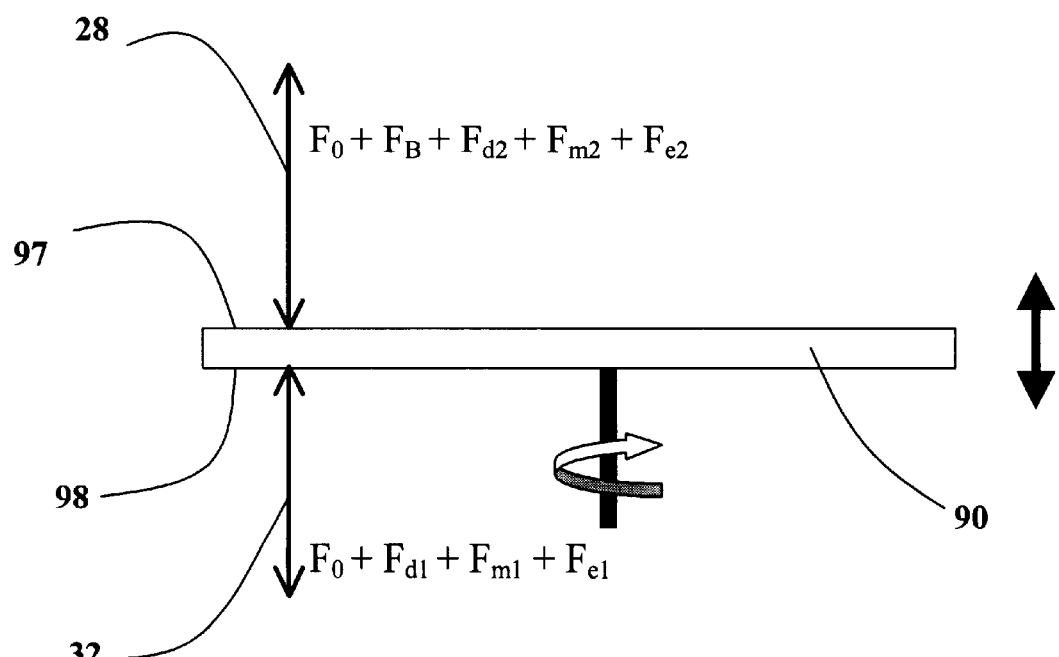
FIG. 19 is a drawing showing the incidence of the two measuring scanning beams on either face of the rotating target.

As seen in FIG. 19, frequency of the measuring beam 32 on reflection from the rotating target 90 on the surface 98 is given by=$F_0+F_{d1}+F_{m1}+F_{e1}$. Frequency of the measuring beam 28 on reflection from the rotating target 90 on the surface 97 is given by=$F_0+F_B+F_{d2}+F_{m2}+F_{e2}$. Where $F_{m1}$ and $F_{m2}$ is the frequency shift induced in beams 32 and 28 due to the dynamic motion of the rotating target 90 measured on either surface 97 and 98 of the target at the same point. $F_{e1}$ and $F_{e2}$ are frequency shift due to pseudo vibration of the rotating target 90 on the beams 32 and 28, respectively. On interference of the beam on the beam splitter 10 as in the previous embodiment the resulting frequency of the interference beam is given by =$F_0+F_B+F_{d2}\pm F_{m2}+F_{e2}-(F_0+F_{d1}\pm F_{m1}+F_{e1})$;=$F_B\pm F_{m2}\pm F_{m1}+F_{e2}-F_{e1}$;=$F_B\pm 2F_m+F_{e2}-F_{e1}$—(4). Since $F_m=F_{m1}$, the vibration was measured at the same point on either surface of the target 90 by aligning the beams 28 and 32. Hence, the resolution of the system is doubled. Also, $F_{e2}\cong F_{e1}$ since frequency shift due to pseudo vibration is very nearly the same due to the above said fact of measuring the surface at nearly the same point on either surface of the rotating target 90. Hence, equation (4) becomes=$F_B\pm 2F_m\pm\delta F_e$ where $\delta F_e$ is negligible. Therefore, the technique nearly eliminates the effect of pseudo vibration induced by the rotating target and also nearly doubles the resolution of the system.

Figure 20:
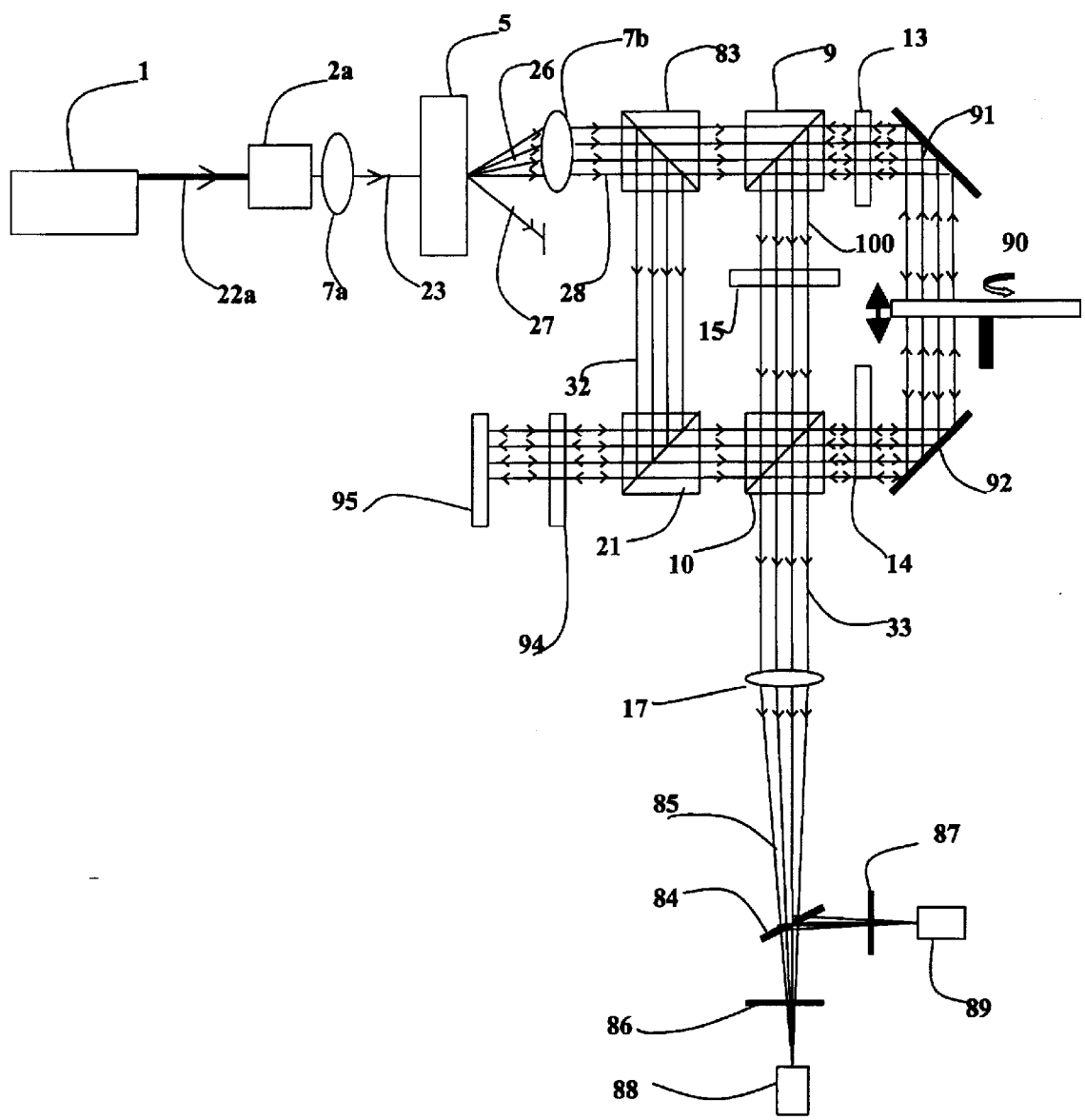
FIG. 20 is a drawing showing the homodyne acousto optic scanning vibrometry set up using single acousto optic deflector for measuring the dynamic parameter of rotary target for the fifth preferred embodiment of the invention.
Figure 21:
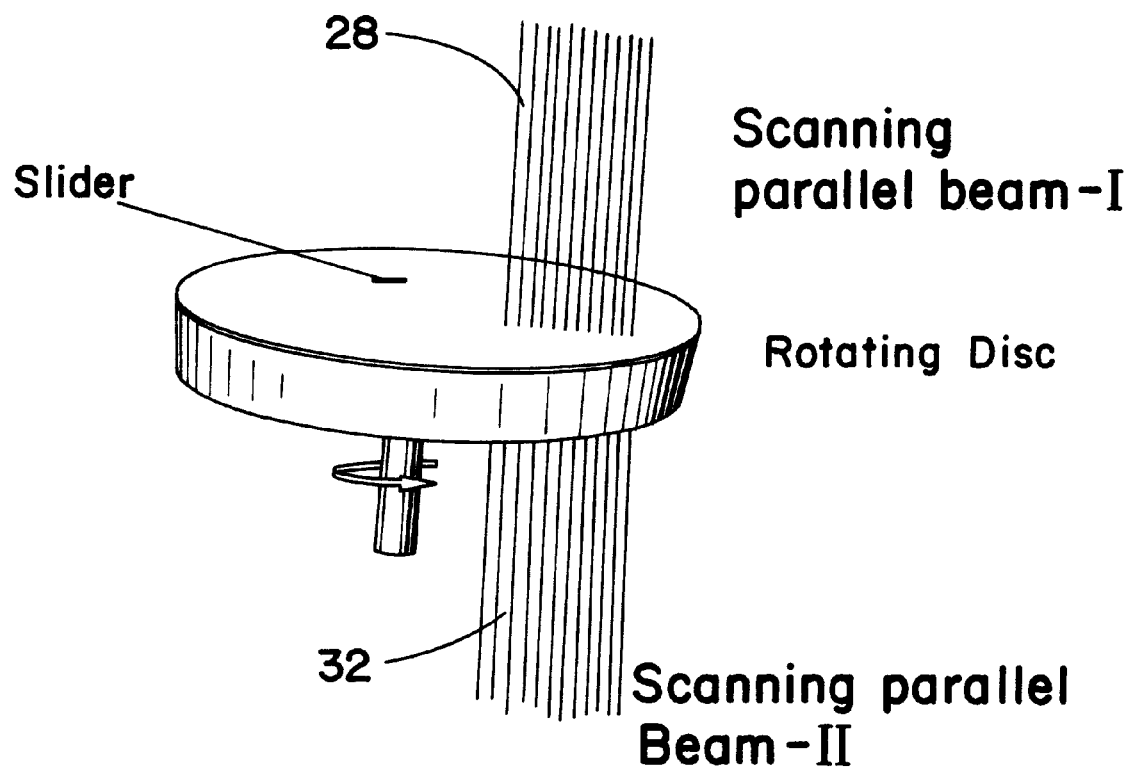
FIG. 21 is a drawing showing the application of parallel scanning on either side of rotating disc.

For a homodyne system on measuring dynamic characteristics of rotating object modification on the on the previous embodiment is made. Referring to the FIG. 20, the beam 28 on passing through polarizing beam splitter 9 and wave-plate 13 is reflected by the mirror 91 onto the surface 98 on the rotating target 90. The beam 32 from the non-polarizing beam splitter 83 is deflected by the polarizing beam splitter 121 on to the preferably plane mirror 95 on passing through a wave-plate 94 preferably quarter wave-plate. The reflected beam from the plane mirror 95 passes through a wave-plate preferably a quarter wave-plate and passes through the polarizing beam splitter 21 and 10. Further, the beam passes through another wave plate, preferably a quarter wave-plate, and is deflected by the deflecting mirror 92 onto the surface 97 of the rotating target 90. The reflected beam on either surface 97 and 98 of the target 90 pass through the same optical component and interfere as in the previous embodiment. On interference of the beam on the beam splitter 10 as in the previous embodiment the resulting frequency of the interference beam is given by=$F_0+F_{d2}\pm F_{m2}+F_{e2}-(F_0+F_{d1}\pm F_{m1}+F_{e1})$;=$\pm F_{m2}\pm F_{m1}F_{e2}-F_{e1}$;=$\pm 2F_m+F_{e2}-F_{e1}$—(5). Also, $F_{m2}=F_{m1}$ and $F_{e2}F_{e1}$ as explained in heterodyne system. Hence, equation (5) becomes=$\pm 2F_m\pm\delta F_e$ where $\delta F_e$ is negligible.

The principle advantages of the fifth embodiment of the present invention, on the measurement of rotating target in addition to the above mentioned advantages are that, the pseudo vibration of the rotating target is nearly eliminated by adopting two measuring beam on either side of the rotating target at the same point, i.e., both the measuring beam have the same optical axis. Other approaches have adopted engineering judgement to eliminate the noise, but it does not eliminate the error. The resolution of the system is doubled in the present invention due to the fact that the optical design employs two measuring beams.

Figure 23:
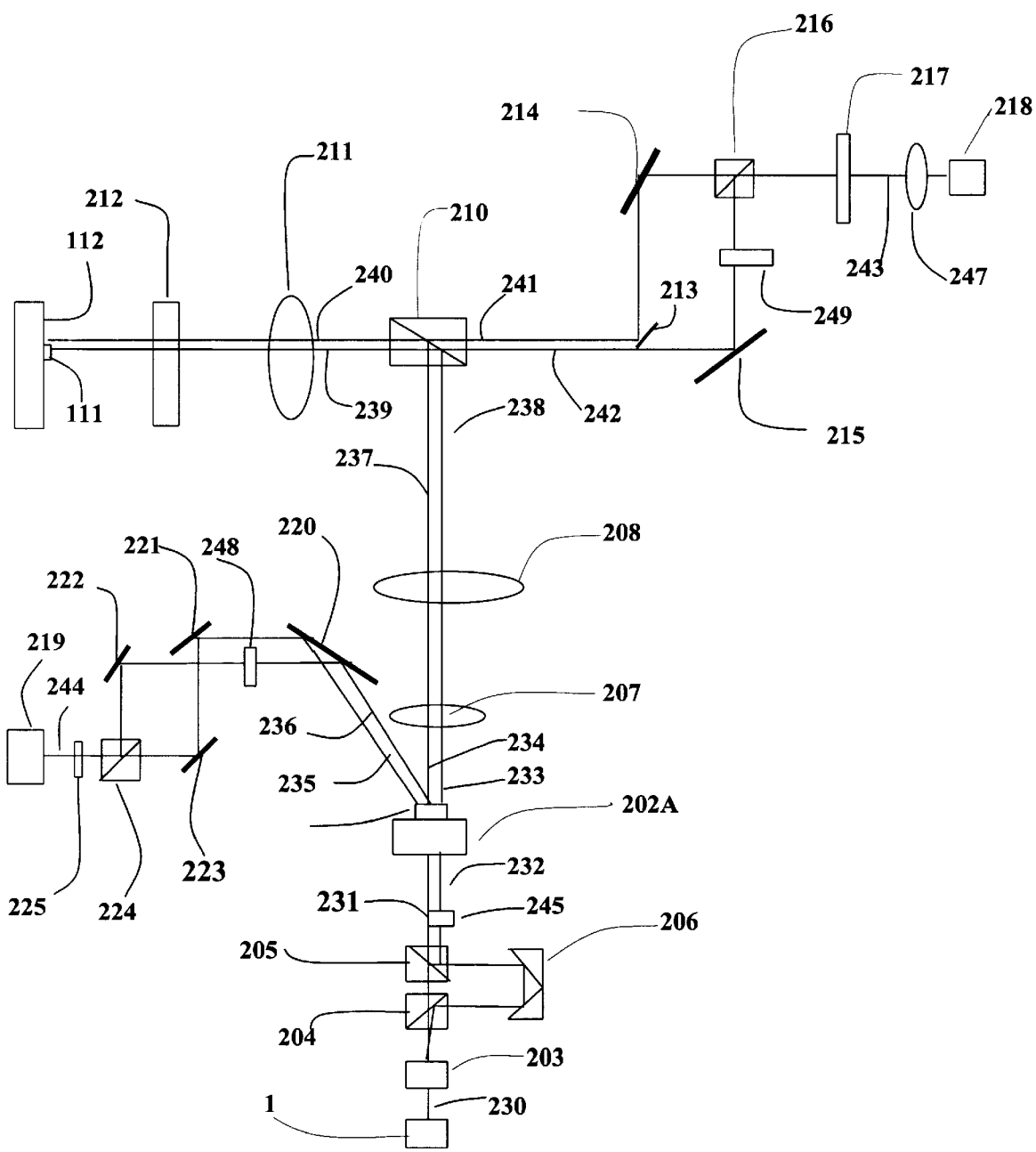
FIG. 23 is a drawing showing the optical layout of heterodyne acousto optic scanning vibrometer for fly-height measurement using single acousto optic deflector for X-axis and Y-axis scanning.

Sixth Embodiment of the Present Invention—Dynamic Parameter Measurement Using Single Acousto Optic Deflector for Each Axis As shown in FIG. 23, for fly-height measurement the laser beam 230 from the source 1 preferably is made to pass through acousto optic modulator 230, which divides the input beam into two beam zero order and first order beams having a frequency difference equal to the signal input to the acousto optic modulator. The zero order beam 231 preferably passes through polarizing beam splitter 204 and 205. The first order beam 232 is deflected preferably by a polarizing beam splitter 204 onto a reflecting element 206, preferably a retro reflector. The reflected beam is again deflected by preferably a polarizing beam splitter 205. This process is made in order to make the two beams 231 and 232 parallel and close to each other. The beam 232 passes through a wave plate, preferably a half wave plate so as to make the two beams 231 and 232 of the same polarization state. The two beams then are made to pass through acousto optic deflectors for X- and Y-axis scanning 202A and 202B. The beam 231 splits into two beams 234 (first order scanning beam) and 235 (zero order beam). Similarly, the beam 232 splits in to two beams 233 (first order scanning beam) and 236 (zero order beam). The two zero order beams 236 and 235 are deflected by preferably a deflecting mirror 220. The beam 236 is deflected by mirror 221 and 223, and made to interfere with the beam 235 deflected by mirror 222 (on passing through a wave plate 247, which is preferably a half wave plate) on a polarizing beam splitter 224. The beam 244 is made to pass through a polarizing plate 225 and strikes the photo detector 219. The first order scanning beam 234 and 233 from the acousto optic deflector 202A and 202B preferably pass through a collimating or focusing optics 207 and through a collimating and focusing optics 208. The purpose of the optics 207 and 208 is to expand the beam size to the requirement. Larger the beam size the smaller will be the spot size. The optics 208 is of larger focal length compared to optics 207. So the optics 207 and 208 act as a beam expander. The expanded scanning beam 237 and 238 are deflected by preferably polarizing beam splitter 210. The deflected beam 239 and 240 passes through a scanning lens, which is preferably a f-theta lens, tele-centric lens or con-focal microscopy lens, etc. The beam 240 focuses on the disk surface 112 and the beam 239 focuses on the slider head surface 111 on passing through a wave plate 212, which is preferably a quarter wave plate. The beams are reflected back carrying the fly-height information and pass through the wave plate 212, scanning lens 211 and polarizing beam splitter 210. The beam 241 is deflected by mirror 213 and 214, and made to pass through the polarizing beam splitter 216. The beam 242 is deflected by mirror 215 and made to pass through a wave plate 249, which is preferably a half wave plate. The two beams 241 and 242 are made to interfere at the polarizing beam splitter 216. The interference beam 243 strikes the photo detector 218 on passing through a polarizer 217 and the collimating lens 246.

Figure 24:
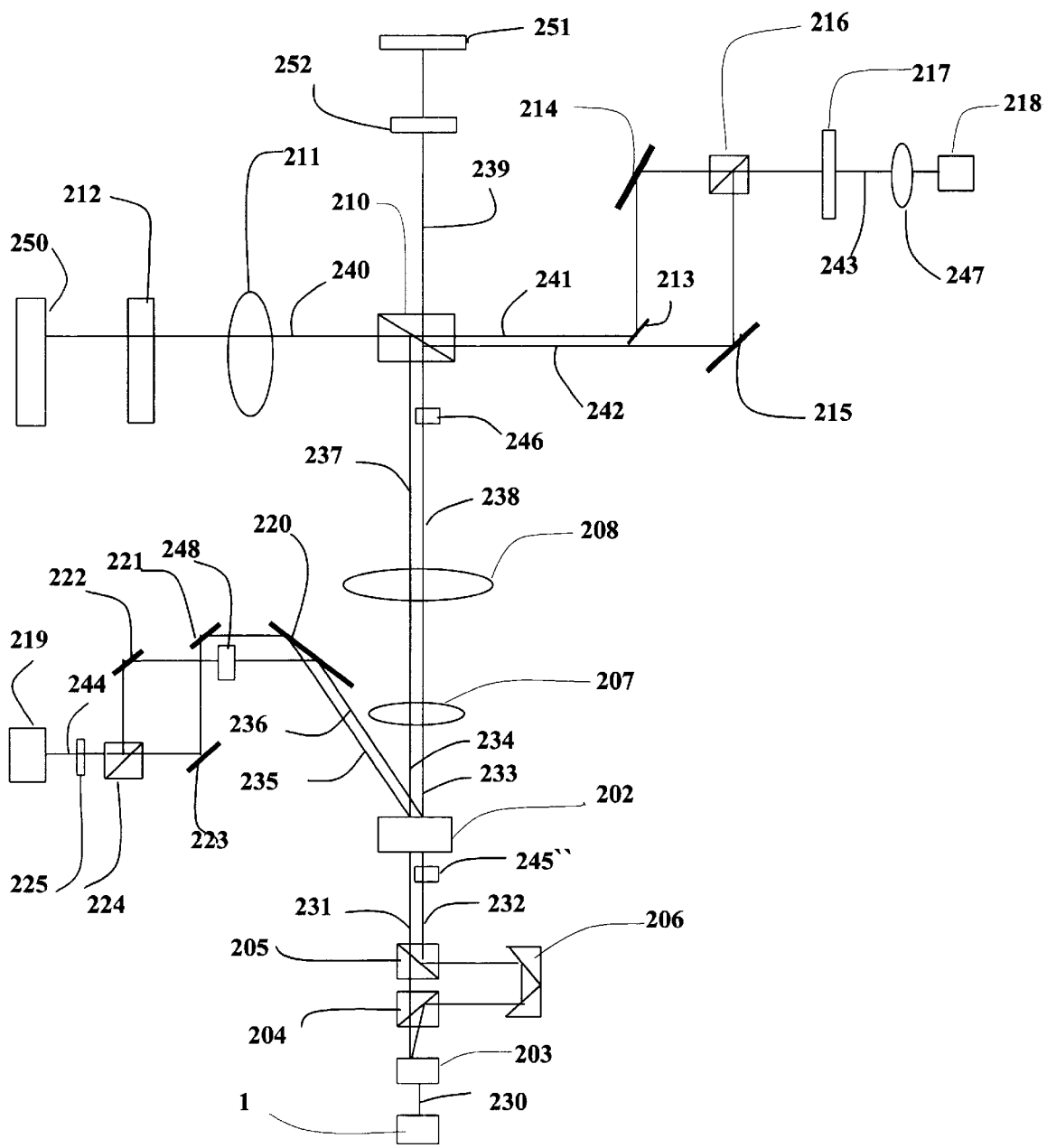
FIG. 24 is a drawing showing the optical layout of heterodyne acousto optic scanning vibrometer for dynamic parameter measurement of micro features using single acousto optic deflector for X-axis and Y-axis scanning.

The system shown in FIG. 23 is modified as shown in FIG. 24 for dynamic parameter measurement of micro features and can also be applied for macro features. Referring to FIG. 24, the expanded beam 237 and 238 takes a different optical path compared to the FIG. 23. The beam 237 is deflected by the polarizing beam splitter 210 on to the scanning lens, which is preferably a f-theta lens, tele-centric lens or con-focal microscopy lens, etc. The beam focuses onto the micro feature 250 to be measured on passing through a wave plate 212. The beam is reflected back passing through the same optics 212, 211 and passes through the polarizing beam splitter 210. The beam 238 passes through a wave plate 246, which is preferably a half wave plate. The beam 239 then passes through the polarizing beam splitter 210 and strikes the reference surface 251 on passing through a wave plate 252, which is preferably a quarter wave plate. The beam is reflected by the reference surface 251 and is deflected by the polarizing beam splitter 210 on passing through the wave plate 252. The measuring beam 241 is made to interfere with the reference beam 242 at the polarizing beam splitter 216 by the deflection by the mirror 213, 214 and 215. The interference beam 243 strikes the photo detector 218 on passing through a polarizer 217. The system can also be modified for measurement of dynamic parameter of rotating micro and macro features.

Figure 25:
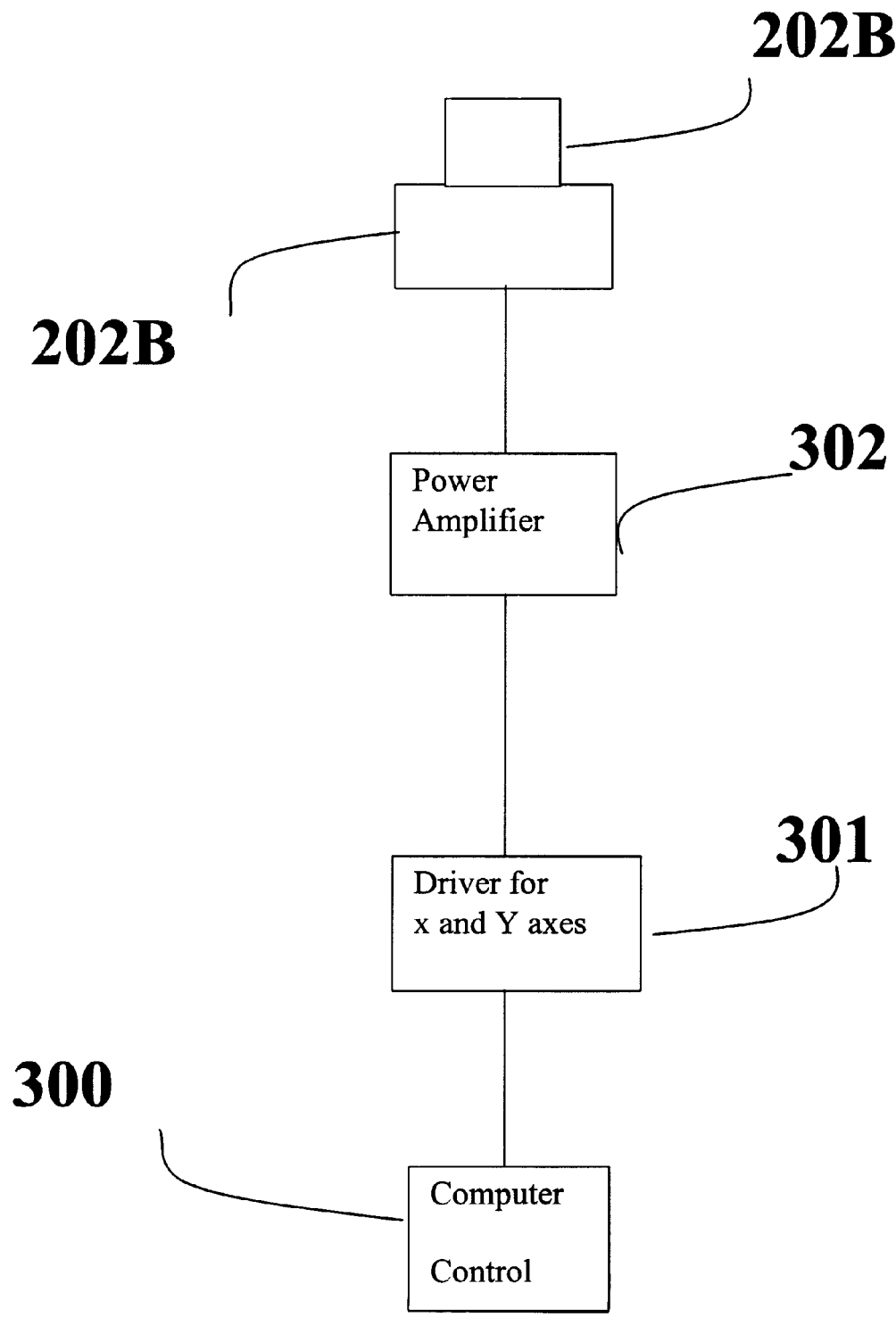
FIG. 25 is a drawing showing the control mechanism of the acousto optic deflector in the sixth preferred embodiment of the present invention.

Referring to FIG. 25, the current embodiment involves one acousto optic deflector 202A for X-axis scanning and one acousto optic deflector 202B for Y-axis scanning rather than two as in previous embodiment. The two acousto optic deflectors 202A and 202B are driven by the driver 301, which is controlled by a computer controller 300. The power amplifier 302 amplifies the signal from the driver 301.

What is claimed is:

1. A method for measuring the dynamic parameters of micro and macro objects, which comprises the steps of:
    illuminating the object with a beam from a coherent source of light having at least a single wavelength and stabilized frequency, said beam being split into two orthogonal polarized beams, the first polarized beams striking a surface of the object of investigation and being reflected, the second polarized beam impinging on a reference surface and being reflected, wherein at least one acousto optic deflector is used for scanning the first polarized beam along a measuring path and for scanning the second polarized beam along a reference path;
    combining the beam reflected from the surface of the object of investigation and the beam from the reference surface and causing them to interfere with each other;
    determining the phase or frequency shift between the beam striking the object of investigation and the beam striking the reference surface, as a result of the difference in the reference and measuring paths; and
    determining from the phase or frequency shift the dynamic parameters of the object under investigation.

2. A method of measuring the dynamic parameters of an object in accordance with claim 1 wherein the coherent light source is a laser.

3. A method of measuring the dynamic parameters of an object in accordance with claim 2 which further includes using a first acousto optic deflector disposed in the measuring path and a second acousto optic deflector disposed in the reference path.

4. A method of measuring the dynamic parameters of an object in accordance with claim 2 which further includes driving the acoustic optic deflector.

5. A method of measuring the dynamic parameters of an object in accordance with claim 2 which further includes scanning in two axes including;
    using a first acousto optic deflector for deflecting the polarized beams along the reference path and measuring path of a first axis and using a second acousto optic deflector for deflecting polarized beams along the reference path and a measuring path of a second axis.

6. A method of measuring the dynamic parameters of an object in accordance with claim 5 which further includes controlling the scanning with a computer.

7. A method of measuring the dynamic parameters of an object in accordance with claim 6 which further includes two focusing lens of a collimating type in each of the reference path and the measuring path, which collimates the beams and maintains the size of the laser beam.

8. A method of measuring the dynamic parameters of an object in accordance with claim 7 which further includes directing the collimated beams on to the object and the reference surface to strike the surface as a series of parallel beams perpendicular to the surface.

9. A method of measuring the dynamic parameters of an object in accordance with claim 8 which further includes causing beams from the measuring path and reference path to interfere.

10. A method of measuring the dynamic parameters of an object in accordance with claim 9 which further includes controlling the scanning angle of each beam on to the surface of the object.

11. A method of measuring the dynamic parameters of an object in accordance with claim 10 which further includes controlling the scanning rate of each beam.

12. A method of measuring the dynamic parameters of an object in accordance with claim 11 which further includes controlling the resolution of scanning.

13. A method of measuring the dynamic parameters of an object in accordance with claim 12 which further includes controlling the overall system of scanning control and data capturing.

14. A method of measuring the dynamic parameters of an object in accordance with claim 13 which further includes capturing data and registering it corresponding to each of a plurality of scanning point coordinates.

15. A method of measuring the dynamic parameters of an object in accordance with claim 14 which further includes varying the capture rate at each of the scanning point coordinates.

16. A method of measuring the dynamic parameters of an object in accordance with claim 15 which further includes manually scanning in a continuous sweeping pattern to deflect the beam to preferred target points.

17. A method of measuring the dynamic parameters of an object in accordance with claim 16 which further includes capturing the interference signal using a homodyne signal processing method.

18. A method of measuring the dynamic parameters of an object in accordance with claim 2 which further includes:
using two acousto optic deflectors, the first acousto optic deflector being located in the reference path and the second acousto optic deflector being located in the measuring path.

19. A method of measuring the dynamic parameters of an object in accordance with claim 16 which further includes capturing the interfering signal by heterodyne signal processing.

20. A method of measuring the dynamic parameters of an object in accordance with claims 17, 18 or 19 which further comprises:
using the beam directed on to the surface of the object and the beam directed on to the reference surface, the reference surface being a disk surface, in order to determine distance between the object surface and the disk surface.

21. A method of measuring the dynamic parameters of an object in accordance with claims 17, 18 or 19 which further comprises:
delivering the beams in the measuring and reference paths on either side of a rotating target; and
aligning the beams in the measuring and reference paths to a common optical axis so that the beams strike the rotating target on either surface of a common target point.

22. A method of measuring the dynamic parameters of an object in accordance with claim 21 which further includes minimizing the effect of pseudo vibration noise by canceling the pseudo-vibration noise measuring on either side of a rotating target.

23. A method of measuring the dynamic parameters of an object in accordance with claim 21 which further includes doubling the resolution of measurement by using the beam in the reference path as an additional measuring beam.

24. A method of measuring the dynamic parameters of an object in accordance with claim 8 which further includes focusing the beam on to the object to a spot size by using the combination of a spatial filter beam expander and scan lens.

25. A method of measuring the dynamic parameters of an object in accordance with claim 8 which further includes using common optical components for the interference of the beams in the measuring path and the reference path.

26. A method of measuring the dynamic parameters of the object in accordance to claim 1 which includes using a single acousto optic deflector for both the measurement path and the reference path of a desired axis.

27. A method according to claim 1 wherein the distance between the surface of the object and the reference surface is the fly-height of a hard disk.

28. A method of measuring the dynamic parameters of an object in accordance to claim 1 which further includes expanding the beam by using a beam expansion technique.

29. A method of measuring the dynamic parameters of an object in accordance to claim 1 which further includes reducing and focusing the beam on to the surface of the object.

30. A method for measuring the dynamic parameters of an object in accordance with claim 1 which further includes reducing the size of the beam from the coherent light source.

31. An acousto optic scanning laser vibrometer for measuring the dynamic parameters of micro and macro objects, comprising:
means for forming a beam from a coherent source of light having at least a single wavelength and stabilized frequency, which is split into two orthogonal polarized beams, the first polarized beam directed along a measurement path and striking the surface of an object of investigation and being reflected, the second polarized beam directed along a reference path and impinging on the reference surface and being reflected;
at least one acousto optic deflector for scanning the first polarized beam along the measuring path and for scanning the second polarized beam along the reference path;
means for combining the beam reflected from the surface of investigation and the beam from the reference surface and causing them to interfere with each other at a photo-detector;
means for determining the phase or frequency shift between the beam striking on the object of investigation and the beam striking the reference surface, as a result of the difference in the reference and measuring paths; and
means for determining from the phase shift or frequency the dynamic parameters of the object under investigation.

32. An apparatus for measuring the dynamic parameters of an object in accordance with claim 31 wherein the coherent source of light is a laser.

33. An apparatus for measuring the dynamic parameters of an object in accordance with claim 32 which further includes a first acousto optic deflector disposed in the measuring path and a second acousto optic deflector disposed in the reference path.

34. An apparatus for measuring the dynamic parameters of an object in accordance with claim 32 which further includes means for driving acousto optic deflectors.

35. An apparatus for measuring the dynamic parameters of a object in accordance with claim 32 which further includes means for scanning in two axes including;
a first acousto optic deflector for deflecting the polarized beams along the reference path and measuring path of a first axis;
a second acousto optic deflector for deflecting polarized beams along the reference path and a measuring path of a second axis.

36. An apparatus for measuring the dynamic parameters of an object in accordance with claim 35 which further includes means for controlling the scanning parameters.

37. An apparatus for measuring the dynamic parameters of a object in accordance with claim 36 which further includes two focusing lens of a collimating type in both the reference path and the measuring path.

38. An apparatus for measuring the dynamic parameters of an object in accordance with claim 37 which further includes means for directing the collimated beams on to the object and the reference surface to strike the surface as a series of parallel beams perpendicular to the surface.

39. An apparatus for measuring the dynamic parameters of an object in accordance with claim 38 which further includes means for causing beams from the measuring path and the reference path to interfere.

40. An apparatus for measuring the dynamic parameters of an object in accordance with claim 39 which further includes means for controlling the scanning angle of the beam directed on to the surface of the object.

41. An apparatus for measuring the dynamic parameters of an object in accordance with claim 40 which further includes means for controlling the scanning rate of the beams.

42. An apparatus for measuring the dynamic parameters of an object in accordance with claim 41 which further includes means for controlling the resolution of scanning.

43. An apparatus for measuring the dynamic parameters of an object in accordance with claim 42 which further includes means for controlling the overall system of scanning control and data capturing.

44. An apparatus for measuring the dynamic parameters of an object in accordance with claim 43 which further includes means for capturing data and registering it corresponding to a plurality of scanning point coordinates.

45. An apparatus for measuring the dynamic parameters of an object in accordance with claim 44 which further includes means for varying the capture rate at each of the scanning point coordinates.

46. An apparatus for measuring the dynamic parameters of an object in accordance with claim 45 which further includes means for manually scanning in a continuous sweeping pattern to deflect beams to preferred target points.

47. An apparatus for measuring the dynamic parameters of an object in accordance with claim 46 which further includes means for capturing the interference signal using a homodyne signal processing method.

48. An apparatus for measuring the dynamic parameters of an object in accordance with claim 32 which further includes:

two acousto optic deflectors, the first acousto optic deflector being located in the reference path and the second acousto optic deflector being located in the measuring path; and means for driving each individual acousto optic deflector.

49. An apparatus for measuring the dynamic parameters of an object in accordance with claim 46 which further includes means for capturing the interfering signal by heterodyne signal processing.

50. An apparatus for measuring the dynamic parameters of an object in accordance with claims 47, 48 or 49, comprising:

means for directing the beam in the measuring path onto the surface of the object and means for directing the beam in the reference path onto the reference surface which is a disk surface, in order to measure the distance of surface of the object with respect to the disk surface.

51. An apparatus for measuring the dynamic parameters of an object in accordance with claims 47, 48 or 49 which further comprises:

means for delivering the beams in the measuring and reference paths to either side of a rotating target; and means for aligning the beams in the measuring and reference paths to a common optical axis so that the beams strike the rotating target on either surface of a common target point.

52. An apparatus for measuring the dynamic parameters of an object in accordance with claim 51 which further includes means for minimizing the effect of pseudo vibration noise by canceling the pseudo-vibration noise measuring on either side of a rotating target.

53. An apparatus for measuring the dynamic parameters of an object in accordance with claim 51 which further includes means for doubling the resolution of measurement by using the beam in the reference path as an additional measuring beam.

54. An apparatus for measuring the dynamic parameters of an object in accordance with claim 8 which further includes means for focusing the beam onto the object to a spot size by using the combination of a spatial filter beam expander and scan lens.

55. An apparatus for measuring the dynamic parameters of an object in accordance with claim 38 which further includes using common optical components for the interference of the beams in the measuring path and the reference path.

56. An apparatus for measuring the dynamic parameters of the object in accordance to claim 31 which includes using a single acousto optic deflector for both the measurement path and the reference path of a desired axis.

57. An apparatus according to claim 31 wherein the distance between the surface of the object and the reference surface is the fly-height of a hard disk.

58. An apparatus for measuring the dynamic parameters of an object in accordance to claim 31 which further includes means for expanding the beam by using a beam expansion technique.

59. An apparatus for measuring the dynamic parameters of an object in accordance to claim 31 which further includes means for reducing and focusing the beam on to the surface of the object.

60. An apparatus for measuring the dynamic parameters of an object in accordance with claim 1 which further includes means for reducing the size of the beam from the coherent light source.

* * * * *